(12) United States Patent
Johnson et al.

(10) Patent No.: US 12,018,627 B2
(45) Date of Patent: Jun. 25, 2024

(54) EXHAUST VALVE, EXHAUST VALVE ASSEMBLY AND EXHAUST VALVE SYSTEM FOR TWO-STROKE INTERNAL COMBUSTION ENGINES, TWO-STROKE INTERNAL COMBUSTION ENGINE HAVING SAME AND METHOD FOR CLEANING AN EXHAUST VALVE

(71) Applicant: BRP US INC., Sturtevant, WI (US)

(72) Inventors: Justin Johnson, Silver Lake, WI (US); Roger Raetzman, Pleasant Prairie, WI (US); Mike Davenport, Pleasant Prairie, WI (US); Joseph Zamora, Burlington, WI (US)

(73) Assignee: BRP US Inc.

(*) Notice: Subject to any disclaimer, the term of this patent is extended or adjusted under 35 U.S.C. 154(b) by 76 days.

(21) Appl. No.: 17/848,204

(22) Filed: Jun. 23, 2022

(65) Prior Publication Data
US 2022/0316421 A1    Oct. 6, 2022

Related U.S. Application Data

(62) Division of application No. 16/915,876, filed on Jun. 29, 2020, now Pat. No. 11,396,853.
(Continued)

(51) Int. Cl.
*F02F 1/42*     (2006.01)
*F02F 3/00*     (2006.01)
*F02F 7/00*     (2006.01)

(52) U.S. Cl.
CPC ............. *F02F 1/4264* (2013.01); *F02F 3/00* (2013.01); *F02F 7/0043* (2013.01)

(58) Field of Classification Search
CPC ....... F01L 1/38; F01L 5/00; F01L 5/02; F01L 5/18; F01L 5/20; F01L 5/22; F01L 5/24;
(Continued)

(56) References Cited

U.S. PATENT DOCUMENTS

| | | | |
|---|---|---|---|
| 4,364,346 A | 12/1982 | Shiohara | |
| 5,000,131 A * | 3/1991 | Masuda | F01L 3/205 123/65 PE |

(Continued)

FOREIGN PATENT DOCUMENTS

WO    2020022949 A2    1/2020

OTHER PUBLICATIONS

Wikipedia contributors. (Jan. 15, 2020). Two-stroke power valve system. In Wikipedia, The Free Encyclopedia. (retrieved Jun. 29, 2020). Retrived from <https://en.wikipedia.org/w/index.php?title=Two-stroke_power_valve_system&oldid=935928532>.
(Continued)

*Primary Examiner* — Grant Moubry
(74) *Attorney, Agent, or Firm* — BCF LLP

(57) ABSTRACT

An exhaust valve assembly for a two-stroke internal combustion engine has a housing adapted for connection to an engine block of the two-stroke internal combustion engine; an electric actuator having an electric motor, the electric motor being disposed in the housing; and at least one reciprocating exhaust valve operatively connected to the electric actuator. The at least one exhaust valve is linearly movable by the electric motor. A portion of the at least one exhaust valve is disposed in the housing.

17 Claims, 29 Drawing Sheets

Related U.S. Application Data

(60) Provisional application No. 62/894,731, filed on Aug. 31, 2019, provisional application No. 62/868,770, filed on Jun. 28, 2019, provisional application No. 62/868,764, filed on Jun. 28, 2019, provisional application No. 62/868,768, filed on Jun. 28, 2019.

(58) Field of Classification Search
CPC ....... F01L 7/02; F01L 7/12; F01L 9/20; F01L 9/22; F01L 2201/00; F01L 2810/03; F01L 2820/032; F02B 2075/025; Y02T 10/12
See application file for complete search history.

(56) References Cited

U.S. PATENT DOCUMENTS

| | | | |
|---|---|---|---|
| 5,758,612 A | 6/1998 | Tsuzuku et al. | |
| 5,934,958 A | 8/1999 | Ochiai | |
| 6,039,013 A | 3/2000 | Motose | |
| 6,155,374 A | 12/2000 | Uchida | |
| 6,158,215 A | 12/2000 | Bosch | |
| 6,189,494 B1 | 2/2001 | Nagumo et al. | |
| 6,227,922 B1 * | 5/2001 | Ochiai | F02B 33/30 440/89 R |
| 6,244,227 B1 | 6/2001 | Matte | |
| 6,622,671 B2 | 9/2003 | Uchida | |
| 6,886,507 B2 | 5/2005 | Olson | |
| 7,367,295 B2 * | 5/2008 | Zauner | F01L 1/026 123/90.11 |
| 7,762,220 B2 | 7/2010 | Okanovic et al. | |
| 8,127,734 B2 * | 3/2012 | Jolley, Jr. | F01L 5/02 123/188.5 |
| 8,201,526 B2 | 6/2012 | Sekira | |
| 8,267,119 B2 * | 9/2012 | Moench | F16K 11/074 123/41.1 |
| 8,925,502 B1 | 1/2015 | Craft et al. | |
| 9,341,092 B2 | 5/2016 | Zauner et al. | |
| 9,404,399 B2 * | 8/2016 | Doppelbauer | F01L 1/38 |
| 10,113,452 B2 | 10/2018 | Matheis et al. | |
| 10,371,021 B2 | 8/2019 | Matheis et al. | |
| 2003/0217716 A1 | 11/2003 | Kusano et al. | |
| 2005/0166872 A1 | 8/2005 | Zauner | |
| 2013/0269664 A1 * | 10/2013 | Park | F02M 26/54 123/568.29 |
| 2015/0330335 A1 * | 11/2015 | Shimada | F02M 26/48 123/568.23 |
| 2017/0107898 A1 | 4/2017 | Nishio | |

OTHER PUBLICATIONS

Notice of Allowance for corresponding U.S. Appl. No. 17/848,198, dated Oct. 3, 2022, 10 pages.
Notice of Allowance issued from the USPTO dated Oct. 13, 2022 in connection with the U.S. Appl. No. 17/848,201 and including PTO-892 Form.

* cited by examiner

EXHAUST VALVE, EXHAUST VALVE ASSEMBLY AND EXHAUST VALVE SYSTEM FOR TWO-STROKE INTERNAL COMBUSTION ENGINES, TWO-STROKE INTERNAL COMBUSTION ENGINE HAVING SAME AND METHOD FOR CLEANING AN EXHAUST VALVE

CROSS-REFERENCE

The present application is a divisional of U.S. patent application Ser. No. 16/915,876, filed Jun. 29, 2020, which claims priority to U.S. Provisional Patent Application No. 62/868,764, filed Jun. 28, 2019; U.S. Provisional Patent Application No. 62/868,768, filed Jun. 28, 2019; U.S. Provisional Patent Application No. 62/868,770, filed Jun. 28, 2019; U.S. Provisional Patent and Application No. 62/894,731, filed Aug. 31, 2019, the entirety of each of which is incorporated herein by reference.

FIELD OF TECHNOLOGY

The present technology relates to exhaust valves, exhaust valve assemblies and exhaust valve systems for two-stroke internal combustion engines, to two-stroke internal combustion engines having same and to methods for cleaning an exhaust valve of an exhaust valve system for a two-stroke internal combustion engine.

BACKGROUND

In two-stroke internal combustion engines, exhaust valves are used to alter the exhaust timing in order to tune the power provided by the engine over a wide range of engine speeds. Different types of exhaust valves exist. One such type of exhaust valve is the reciprocating exhaust valve.

A reciprocating exhaust valve is provided at least in part in an exhaust valve passage that communicates with the exhaust passage of a cylinder of the engine. The exhaust valve has a shaft connected to an actuator and a blade connected to the shaft. The actuator slides the exhaust valve in the exhaust valve passage between various positions. In one or more such positions, the blade is received at least in part in the exhaust passage to block a portion of the exhaust passage, thereby changing the exhaust timing.

The exhaust gases contain various components, such as loose oily exhaust soot, that can deposit on the blade of the exhaust valve and the walls of the exhaust valve passage. The exhaust gas components may carbonize, or coke, on the blade of the exhaust valve and the walls of the exhaust valve passage when a sufficiently high temperature is reached. These carbonized, or coked, deposits can impede movement of the exhaust valve.

In order to prevent the above from happening, the exhaust valves and exhaust valve passages typically need to be cleaned periodically. This typically requires disassembly of the exhaust valves and its associated components from the engine. This is inconvenient, time consuming and typically too complex for a user of the engine to do himself/herself. As such, this cleaning is typically done by a qualified mechanic.

One solution used by engineers designing engines with reciprocating exhaust valves has been to make the clearance between the blade of the exhaust valve and the walls of the exhaust valve passage as small as possible. This limits the exposure of the blade to the exhaust components that could carbonize, or coke.

Another solution consists in making the exhaust valve from a material having a relatively high thermal conductivity, such as aluminum. As a result, heat is quickly conducted away from the blade to the shaft of the exhaust valve and other surrounding components, in an attempt to keep the temperature of the blade below the carbonization, or coking, temperature of the exhaust components that deposit on the blade, thereby preventing carbonization, or coking, from occurring.

Although such solutions are adequate for applications where the engine is often used at relatively high engine speeds, such as in snowmobiles and motocross, they can prove to be insufficient for applications where the engine is often used at relatively low speeds, such as in marine outboard engines that are often used at trolling speeds.

There is therefore a desire for a reciprocating exhaust valve for a two-stroke engine that addresses the problem of exhaust component deposits described above.

There is therefore also a desire for a two-stroke engine having a reciprocating exhaust valve that addresses the problem of exhaust component deposits described above.

There is therefore also a desire for an exhaust valve for a two-stroke internal combustion engine and a method for cleaning an exhaust valve of such a system that address the problem of cleaning exhaust component deposits from the exhaust valve described above.

In some engines, the exhaust valves are actuated by pressure inside the crankcase of the engine. In other engines, a governor connected to a crankshaft of the engine operates a clutch that in turn actuates the exhaust valves as the engine speed goes above or below a threshold engine speed. Although adequate, these actuators limit the degree of control of the exhaust valves.

In other engines, an electric motor drives a hydraulic pump and the exhaust valves are hydraulically actuated. Although this permits more control of the exhaust valves, the hydraulic pump and all of the associated hydraulic components required make this a complex and bulky system.

In yet other engines, an electric motor is connected via a push-pull cable to the exhaust valves. The push-pull cable is provided in order to permit mounting of the electric motor remotely from the engine in order to isolate it from engine heat and vibrations. Although this permits more control of the exhaust valves, in some applications, such as in marine outboard engine, it is not possible to mount the electric motor remotely from the engine and/or it is not easily feasible to properly route the push-pull cable.

There is therefore also a desire for an exhaust valve assembly for a two-stroke engine that addresses the problems described above.

SUMMARY

It is an object of the present technology to ameliorate at least some of the inconveniences present in the prior art.

Contrary to the above-described prior art solutions which attempt to limit the exposure of the exhaust valve to the exhaust gas and to limit the temperature of the blade of the exhaust valve, the present technology takes a diametrically opposite approach. The present technology increases the exposure of the blade of the exhaust gases and build up heat in the blade in an attempt to have the temperature of the portions of the blade where carbon can build up reach the carbon burn-off temperature under at least some operating conditions of the engine. The carbon burn-off temperature is higher than the carbonization, or coking, temperature of the exhaust gas components. When the carbon burn-off temperature is reached, the carbonized components burn-off the blade or crack, crumble and fall away from the blade, thereby cleaning the blade of the exhaust valve.

In one aspect of the present technology, this is achieved by providing an exhaust valve having a blade defining a channel that together with a wall of an exhaust valve passage inside which the exhaust valve is disposed define a valve passage. Due to the relatively large size of the valve passage, a substantial flow of exhaust gases along the face of the blade defining the channel is permitted which permits the exhaust gases, under certain operating conditions of the engine, to heat the blade above the carbon burn-off temperature of exhaust components that may have accumulated on the blade. Also, the size of the valve passage does not promote the compaction of the exhaust gas components between the blade and the wall of the exhaust valve passage and permits these components to fall into the exhaust passage of the cylinder block as the exhaust valve reciprocates.

In another aspect of the present technology, this is achieved by providing a blade having thinner portions where heat can build up. In some embodiments, the blade is made of a material having a relatively low thermal conductivity, such as stainless steel for example.

According to one aspect of the present technology, there is provided a two-stroke internal combustion engine having an engine block having a cylinder block and a cylinder head. The cylinder block defines: a cylinder defining a cylinder axis; an exhaust passage communicating with the cylinder; and an exhaust valve passage communicating with the exhaust passage, the exhaust valve passage having a first wall and a second wall. The cylinder head is connected to the cylinder block. The first wall of the exhaust valve passage is closer to the cylinder head than the second wall of the exhaust valve passage in a direction defined by the cylinder axis. The engine also has a piston disposed in the cylinder; an exhaust valve actuator operatively connected to at least one of the cylinder block and the cylinder head; and a reciprocating exhaust valve disposed at least in part in the exhaust valve passage. The reciprocating exhaust valve has a shaft operatively connected to a valve actuator, the shaft defining a reciprocation axis of the valve, the reciprocation axis defining a longitudinal direction of the valve; and a blade. The blade has a first end having an arcuate edge; a second end opposite the first end, the shaft being connected to the second end; a first face facing the first wall of the exhaust valve passage; and a second face opposite the first face, the second face facing the second wall of the exhaust valve passage. Each of the first and second faces extends between the first and second ends. A channel is defined along the second face. The channel extends in the longitudinal direction. The channel and the second wall of the exhaust valve passage together define at least in part a valve passage. The valve passage permits flow of exhaust gas from the first end of the blade to the second end of the blade. A width of the valve passage is at least a third of a width of the blade. The width of the valve passage and the width of the blade are measured in a lateral direction. The lateral direction is perpendicular to the longitudinal direction.

In some embodiments of the present technology, the width of the valve passage is at least half of the width of the blade.

In some embodiments of the present technology, the channel is a first channel. A second channel is defined along the second face. The second channel extends in the longitudinal direction. The first and second channels are disposed on opposite sides of the reciprocation axis. The valve passage is defined at least in part by the first channel, the second channel and the second wall of the exhaust valve passage.

In some embodiments of the present technology, a majority of the first face is flat.

In some embodiments of the present technology, the blade has a first end portion adjacent the first end; a second end portion adjacent the second end; and a mid-portion disposed longitudinally between the first and second end portions. A thickness of a part of the second end portion defining the channel is less than a thickness of a part of the mid-portion defining the channel. The thickness of the part of the second end portion and of the part of the mid-portion is measured in a direction perpendicular to the longitudinal and lateral directions.

In some embodiments of the present technology, the shaft defines a stopper.

In some embodiments of the present technology, the stopper is in sliding fit with the exhaust valve passage.

In some embodiments of the present technology, a clearance between the stopper and a portion of the cylinder block defining the exhaust valve passage is less than a minimum clearance between the blade and the portion of the cylinder block defining the exhaust valve passage.

In some embodiments of the present technology, a maximum thickness of the passage is at least one third of a diameter of the stopper. The thickness of the passage is measured in a direction perpendicular to the longitudinal and lateral directions.

In some embodiments of the present technology, the cylinder is a plurality of cylinder; the exhaust passage is a plurality of exhaust passages, each exhaust passage of the plurality of exhaust passages communicating with a corresponding cylinder of the plurality of cylinder; the exhaust valve passage is a plurality of exhaust passages, each exhaust valve passage of the plurality of exhaust valve passages communicating with a corresponding exhaust passage of the plurality of exhaust passages; the piston is a plurality of pistons, each piston of the plurality of pistons is disposed in a corresponding cylinder of the plurality of cylinders; and the reciprocating exhaust valve is a plurality of reciprocating exhaust valves, each reciprocating exhaust valve of the plurality of reciprocating exhaust valves being disposed at least in part in a corresponding exhaust valve passage of the plurality of exhaust valve passages.

In some embodiments of the present technology, each reciprocating exhaust valve of the plurality of reciprocating exhaust valves is operatively connected to the exhaust valve actuator.

According to another aspect of the present technology, there is provided a reciprocating exhaust valve for a two-stroke internal combustion engine having a shaft for connection to a valve actuator, the shaft defining a reciprocation axis of the valve, the reciprocation axis defining a longitudinal direction of the valve; and a blade having a first end and a second end opposite the first end. The shaft is connected to the second end of the blade. The first end has an arcuate edge. The blade has two side portions and a central portion. The central portion is disposed between the two side portions in a lateral direction of the valve. The lateral direction is perpendicular to the longitudinal direction. The blade has a first end portion adjacent the first end. The first end portion includes a part of the central portion and a part of each of the two side portions. A width of the central portion is greater than a width of each of the side portions. The width of the central portion and the width of each of the side portions is measured in the lateral direction.

A thickness of the part of each of the two side portions in the first end portion is greater than a thickness of the part of the central portion in the first end portion. The thickness of each of the side portions and the thickness of the central portion is measured in a direction perpendicular to the longitudinal and lateral directions.

In some embodiments of the present technology, the width of the central portion is greater than a sum of the widths of the two side portions.

In some embodiments of the present technology, the width of the central portion is greater than half of a width of the blade, the width of the blade being measured in the lateral direction.

In some embodiments of the present technology, the blade has a first face and a second face opposite the first face. Each of the first and second faces extends between the first and second ends. A majority of the first face is flat. The blade has a reinforcing structure provided on the second face.

In some embodiments of the present technology, the reinforcing structure is a plurality of ribs.

In some embodiments of the present technology, a cross-section of each of the two side portions is generally semi-circular, the cross-section being taken through a plane extending in the lateral direction and being normal to the reciprocation axis.

In some embodiments of the present technology, the blade has a first face and a second face opposite the first face. Each of the first and second faces extends between the first and second ends. A majority of the first face is flat. The two side portions are a first side portion and a second side portion. A first channel is defined along the second face adjacent to the first side portion. The first side portion and the central portion define at least in part the first channel. The first channel is disposed completely on a same side of the reciprocation axis as the first side portion. A second channel is defined along the second face adjacent to the second side portion. The second side portion and the central portion define at least in part the second channel. The second channel is disposed completely on a same side of the reciprocation axis as the second side portion. The first and second channels extend in the longitudinal direction.

In some embodiments of the present technology, the blade has a mid-portion adjacent the first end portion and disposed longitudinally between the first end portion and the second end of the blade. The mid-portion includes another part of the central portion and another part of each of the two side portions. A thickness of the other part of the central portion in the mid-portion is greater than the thickness of the part of the central portion in the first end portion.

In some embodiments of the present technology, the shaft defines a stopper.

In some embodiments of the present technology, the shaft includes: a first shaft portion for connection to the valve actuator; and a second shaft portion connected to the second end of the blade. The first shaft portion has a first diameter. At least part of the second shaft portion has a second diameter defining the stopper. The second diameter is greater than the first diameter.

In some embodiments of the present technology, the blade is a stainless-steel blade.

In some embodiments of the present technology, the blade and the shaft are integral.

According to another aspect of the present technology, there is provided a two-stroke internal combustion engine having an engine block defining: a cylinder; an exhaust passage communicating with the cylinder; and an exhaust valve passage communicating with the exhaust passage. The engine also has a piston disposed in the cylinder, the reciprocating exhaust valve of any one of the above aspect and embodiments disposed at least in part in the exhaust valve passage, and an exhaust valve actuator operatively connected to the exhaust valve for moving the blade of the exhaust valve in the exhaust passage.

According to another aspect of the present technology, the is provided a reciprocating exhaust valve for a two-stroke internal combustion engine having a shaft for connection to a valve actuator, the shaft defining a reciprocation axis of the valve, the reciprocation axis defining a longitudinal direction of the valve; and a blade having a first end and a second end opposite the first end. The first end has an arcuate edge. The blade has two side portions and a central portion. The central portion is disposed between the two side portions in a lateral direction of the valve. The lateral direction is perpendicular to the longitudinal direction. The central portion has two central sub-portions adjacent the second end. The shaft is connected to the second end laterally between the two central sub-portions. The central portion has a central mid-portion adjacent the two central sub-portion and disposed longitudinally between the two central sub-portions and the first end of the blade. A thickness of each of the two central sub-portions is less than a thickness of the central mid-portion. The thickness of each of the two central sub-portions and the thickness of the central mid-portion are measured in a direction perpendicular to the longitudinal and lateral directions.

In some embodiments of the present technology, the second end has two arcuate edges. The shaft is connected to the second end laterally between the two arcuate edges.

In some embodiments of the present technology, the blade also has a first flange connected to and extending perpendicularly to one of the two central sub-portions; and a second flange connected to and extending perpendicularly to another one of the two central sub-portions. The first and second flanges are adjacent to the second end.

In some embodiments of the present technology, the blade has a first face and a second face opposite the first face. Each of the first and second faces extends between the first and second ends. A majority of the first face is flat. The blade has a reinforcing structure provided on the second face.

In some embodiments of the present technology, the reinforcing structure is a plurality of ribs.

In some embodiments of the present technology, the blade has a first face and a second face opposite the first face. Each of the first and second faces extends between the first and second ends. A majority of the first face is flat. The two side portions are a first side portion and a second side portion. A first channel is defined along the second face adjacent to the first side portion. The first side portion and the central portion define at least in part the first channel. The first channel is disposed completely on a same side of the reciprocation axis as the first side portion. A second channel is defined along the second face adjacent to the second side portion. The second side portion and the central portion define at least in part the second channel. The second channel is disposed completely on a same side of the reciprocation axis as the second side portion. The first and second channels extend in the longitudinal direction.

In some embodiments of the present technology, a thickness of a part of the central portion disposed laterally between the two central sub-portions is greater than the thickness of each of the two central sub-portions. The thickness of the part of the central portion is measured in the direction perpendicular to the longitudinal and lateral directions.

In some embodiments of the present technology, the shaft defines a stopper.

In some embodiments of the present technology, the shaft includes a first shaft portion for connection to the valve actuator; and a second shaft portion connected to the second end of the blade. The first shaft portion has a first diameter. At least part of the second shaft portion has a second diameter defining the stopper. The second diameter is greater than the first diameter.

In some embodiments of the present technology, the blade is a stainless-steel blade.

In some embodiments of the present technology, the blade and the shaft are integral.

According to another aspect of the present technology, there is provided a two-stroke internal combustion engine having an engine block defining: a cylinder; an exhaust passage communicating with the cylinder; and an exhaust valve passage communicating with the exhaust passage. The engine also has a piston disposed in the cylinder; the reciprocating exhaust valve of any one of the above aspect and embodiments disposed at least in part in the exhaust valve passage; and an exhaust valve actuator operatively connected to the exhaust valve for moving the blade of the exhaust valve in the exhaust passage.

In another aspect, the present technology determines that exhaust components have likely deposited on the exhaust valve when the exhaust valve fails to reach its desired position (open or closed). When this happens, the exhaust valve is moved to an intermediate position where the exhaust valve is exposed to the exhaust gases. As a result, heat builds up in the exhaust valve in an attempt to have the temperature of the portions of the exhaust valve where carbon can build up reach the carbon burn-off temperature under at least some operating conditions of the engine. The carbon burn-off temperature is higher than the carbonization, or coking, temperature of the exhaust gas components. When the carbon burn-off temperature is reached, the carbonized components burn-off the exhaust valve or crack, crumble and fall away from the exhaust valve, thereby cleaning the exhaust valve.

According to another aspect of the present technology, there is provided an exhaust valve system for a two-stroke internal combustion engine having: at least one exhaust valve movable between an open position and a closed position; an actuator operatively connected to the at least one exhaust valve for moving the at least one exhaust valve between the open position and the closed position; a valve position sensor for determining a position of the at least one exhaust valve; and a controller communicating with the actuator for controlling the actuator, the controller communicating with the valve position sensor for receiving a signal indicative of the position of the at least one exhaust valve. The controller is programmed for: a) controlling the actuator to attempt to move the at least one exhaust valve to a desired one of the open position and the closed position; b) determining if the at least one exhaust valve has failed to reach the desired one of the open position and the closed position based on the position of the at least one exhaust valve sensed by the valve position sensor; and c) controlling the actuator to move the at least one exhaust valve to an intermediate position when the at least one exhaust valve has failed to reach the desired one of the open position and the closed position, the intermediate position of the at least one exhaust valve being between the open position and the closed position.

According to some embodiments of the present technology, determining if the at least one exhaust valve has failed to reach the desired one of the open position and the closed position comprises comparing the position of the at least one exhaust valve sensed by the valve position sensor to the desired one of the open position and the closed position.

According to some embodiments of the present technology, controlling the actuator to move the at least one exhaust valve to the intermediate position comprises controlling the actuator to move the at least one exhaust valve to the intermediate position for a predetermined amount of time. Once the at least one exhaust valve has been in the intermediate position for the predetermined amount of time, the controller is further programmed for: d) controlling the actuator to reattempt to move the at least one exhaust valve to the desired one of the open position and the closed position; and e) comparing the position of the at least one exhaust valve sensed by the valve position sensor to the desired one of the open position and the closed position to determine if the at least one exhaust valve has failed again to reach the desired one of the open position and the closed position.

According to some embodiments of the present technology, controlling the actuator to move the at least one exhaust valve to the intermediate position comprises controlling the actuator to move the at least one exhaust valve to the intermediate position for a predetermined amount of time. Once the at least one exhaust valve has been in the intermediate position for the predetermined amount of time, the controller is further programmed for: d) controlling the actuator to reattempt to move the at least one exhaust valve to the desired one of the open position and the closed position.

According to some embodiments of the present technology, subsequent to step d), the controller is further programmed for: e) determining if the at least one exhaust valve has failed to reach the desired one of the open position and the closed position based on the position of the at least one exhaust valve sensed by the valve position sensor.

According to some embodiments of the present technology, if at step e) the controller determines that the at least one exhaust valve has failed again to reach the desired one of the open position and the closed position, the controller is further programmed for: f) controlling the actuator to move the at least one exhaust valve to the intermediate position for the predetermined amount of time; and then g) repeating steps d) and e), and, if the at least one exhaust valve has failed again to reach the desired one of the open position and the closed position, step f), until: the controller determines at a subsequent instance of step e) that the at least one exhaust valve has not failed to reach the desired one of the open position and the closed position; or steps d) and e) have been repeated a predetermined number of times with the at least one exhaust valve having failed each time to reach the desired one of the open position and the closed position.

According to some embodiments of the present technology, the predetermined amount of time is a first predetermined amount of time. If steps d) and e) have been repeated the first predetermined number of times with the at least one exhaust valve having failed each time to reach the desired one of the open position and the closed position, the controller is further programmed for: h) maintaining the at least one exhaust valve in a current position for a second predetermined amount of time, then controlling the actuator to move the at least one exhaust valve to the intermediate position for a third predetermined amount of time, the second predetermined amount of time being greater than the first predetermined amount of time, the third predetermined amount of time being less than the first predetermined amount of time; i) controlling the actuator to reattempt to move the at least one exhaust valve to the desired one of the open position and the closed position; j) determining if the at least one exhaust valve has failed again to reach the desired one of the open position and the closed position based on the position of the at least one exhaust valve sensed by the valve position sensor; and k) repeating steps i) and j), and, if the at least one exhaust valve has failed again to reach the desired one of the open position and the closed position, step h), until the controller determines at step j) that the at least one exhaust valve has not failed to reach the desired one of the open position and the closed position.

According to some embodiments of the present technology, the controller is further programmed for: l) performing step c) and any subsequent steps only if at step b): the controller determines that the at least one exhaust valve has failed to reach the desired one of the open position and the closed position; and the position of the at least one exhaust valve is at less than a predetermined distance from the desired one of the open position and the closed position. If at step b): the controller determines that the at least one exhaust valve has failed to reach the desired one of the open position and the closed position; and the position of the at least one exhaust valve is at more than the predetermined distance from the desired one of the open position and the closed position, then the controller is programmed for: m) controlling the actuator to move the at least one exhaust valve to one of the open position and the closed position other than the desired one of the open position and the closed position; and n) returning to step a).

According to some embodiments of the present technology, step m) comprises maintaining the at least one exhaust valve in the one of the open position and the closed position other than the desired one of the open position and the closed position for a predetermined amount of time before performing step n).

According to some embodiments of the present technology, at step m) the predetermined amount of time before performing step n) is an amount of time for which the internal combustion engine has been operating above a predetermined engine speed.

According to some embodiments of the present technology, the controller is further programmed for maintaining the at least one exhaust valve in the one of the open and the closed position other than the desired one of the open position and the closed position until the internal combustion engine is turned off if step m) has been performed a predetermined number of time.

According to some embodiments of the present technology, the desired one of the open position and the closed position is the open position.

According to some embodiments of the present technology, the predetermined amount of time is greater when the desired one of the open position and the closed position is the open position than when the desired one of the open position and the closed position is the closed position.

According to some embodiments of the present technology, the intermediate position is or is approximately halfway between the open position and the closed position.

According to some embodiments of the present technology, in the intermediate position the at least one exhaust valve does not affect port timing of the internal combustion engine and is exposed to exhaust gas flow.

According to some embodiments of the present technology, each of the at least one exhaust valve comprises a blade.

According to some embodiments of the present technology, the at least one exhaust valve is at least one reciprocating exhaust valve.

According to some embodiments of the present technology, the actuator is a linear actuator.

According to some embodiments of the present technology, the actuator is an electrical actuator.

According to some embodiments of the present technology, the valve position sensor senses a position of the actuator for determining the position of the at least one exhaust valve.

According to some embodiments of the present technology, the at least one exhaust valve is a plurality of exhaust valves.

According to some embodiments of the present technology, the controller determines that the at least one exhaust valve has failed to reach the desired one of the open position and the closed position if the position of the at least one exhaust valve is at more than a predetermined distance from the desired one of the open position and the closed position.

According to some embodiments of the present technology, the predetermined distance is greater when the desired one of the open position and the closed position is the open position than when the desired one of the open position and the closed position is the closed position.

According to some embodiments of the present technology, the predetermined distance is at least 5 percent of a total distance between the open position and the closed position.

According to some embodiments of the present technology, the controller is further programmed for: entering a fault operation mode if, in response to the actuator attempting to move the at least one exhaust valve to the desired one of the open position and the closed position, the at least one exhaust valve has moved by less than a predetermined amount.

According to some embodiments of the present technology, the predetermined amount corresponds to 5 percent of a total distance between the open position and the closed position.

According to some embodiments of the present technology, in the fault operation mode, the controller limits performance of the engine provided with the exhaust valve system.

In another aspect of the present technology, there is provided a method for cleaning at least one exhaust valve of an exhaust valve system for a two-stroke internal combustion system. The method comprises: a) controlling an actuator operatively connected to the at least one exhaust valve to attempt to move the at least one exhaust valve to a desired one of an open position and a closed position; b) determining if the at least one exhaust valve has failed to reach the desired one of the open position and the closed position based on a position of the at least one exhaust valve sensed by a valve position sensor; and c) controlling the actuator to move the at least one exhaust valve to an intermediate position when the at least one exhaust valve has failed to reach the desired one of the open position and the closed position, the intermediate position of the at least one exhaust valve being between the open position and the closed position.

According to some embodiments of the present technology, determining if the at least one exhaust valve has failed to reach the desired one of the open position and the closed position comprises comparing the position of the at least one exhaust valve sensed by the valve position sensor to the desired one of the open position and the closed position.

According to some embodiments of the present technology, controlling the actuator to move the at least one exhaust valve to the intermediate position comprises controlling the actuator to move the at least one exhaust valve to the intermediate position for a predetermined amount of time. Once the at least one exhaust valve has been in the intermediate position for the predetermined amount of time: d) controlling the actuator to reattempt to move the at least one exhaust valve to the desired one of the open position and the closed position; and e) comparing the position of the at least one exhaust valve sensed by the valve position sensor to the desired one of the open position and the closed position to determine if the at least one exhaust valve has failed again to reach the desired one of the open position and the closed position.

According to some embodiments of the present technology, controlling the actuator to move the at least one exhaust valve to the intermediate position comprises controlling the actuator to move the at least one exhaust valve to the intermediate position for a predetermined amount of time. Once the at least one exhaust valve has been in the intermediate position for the predetermined amount of time: d) controlling the actuator to reattempt to move the at least one exhaust valve to the desired one of the open position and the closed position.

According to some embodiments of the present technology, subsequent to step d): e) determining if the at least one exhaust valve has failed to reach the desired one of the open position and the closed position based on the position of the at least one exhaust valve sensed by the valve position sensor.

According to some embodiments of the present technology, if at step e) the controller determines that the at least one exhaust valve has failed again to reach the desired one of the open position and the closed position: f) controlling the actuator to move the at least one exhaust valve to the intermediate position for the predetermined amount of time; and then g) repeating steps d) and e), and, if the at least one exhaust valve has failed again to reach the desired one of the open position and the closed position, step f), until: the controller determines at a subsequent instance of step e) that the at least one exhaust valve has not failed to reach the desired one of the open position and the closed position; or steps d) and e) have been repeated a predetermined number of times with the at least one exhaust valve having failed each time to reach the desired one of the open position and the closed position.

According to some embodiments of the present technology, the predetermined amount of time is a first predetermined amount of time. If steps d) and e) have been repeated the first predetermined number of times with the at least one exhaust valve having failed each time to reach the desired one of the open position and the closed position: h) maintaining the at least one exhaust valve in a current position for a second predetermined amount of time, then controlling the actuator to move the at least one exhaust valve to the intermediate position for a third predetermined amount of time, the second predetermined amount of time being greater than the first predetermined amount of time, the third predetermined amount of time being less than the first predetermined amount of time; i) controlling the actuator to reattempt to move the at least one exhaust valve to the desired one of the open position and the closed position; j) determining if the at least one exhaust valve has failed again to reach the desired one of the open position and the closed position based on the position of the at least one exhaust valve sensed by the valve position sensor; and k) repeating steps i) and j), and, if the at least one exhaust valve has failed again to reach the desired one of the open position and the closed position, step h), until the controller determines at step j) that the at least one exhaust valve has not failed to reach the desired one of the open position and the closed position.

According to some embodiments of the present technology, the method further comprises l) performing step c) and any subsequent steps only if at step b): the controller determines that the at least one exhaust valve has failed to reach the desired one of the open position and the closed position; and the position of the at least one exhaust valve is at less than a predetermined distance from the desired one of the open position and the closed position. If at step b): the controller determines that the at least one exhaust valve has failed to reach the desired one of the open position and the closed position; and the position of the at least one exhaust valve is at more than the predetermined distance from the desired one of the open position and the closed position, then m) controlling the actuator to move the at least one exhaust valve to one of the open position and the closed position other than the desired one of the open position and the closed position; and n) returning to step a).

According to some embodiments of the present technology, step m) comprises maintaining the at least one exhaust valve in the one of the open position and the closed position other than the desired one of the open position and the closed position for a predetermined amount of time before performing step n).

According to some embodiments of the present technology, at step m) the predetermined amount of time before performing step n) is an amount of time for which the internal combustion engine has been operating above a predetermined engine speed.

According to some embodiments of the present technology, the method further comprises maintaining the at least one exhaust valve in the one of the open and the closed position other than the desired one of the open position and the closed position until the internal combustion engine is turned off if step m) has been performed a predetermined number of time.

According to some embodiments of the present technology, the desired one of the open position and the closed position is the open position.

According to some embodiments of the present technology, the predetermined amount of time is greater when the desired one of the open position and the closed position is the open position than when the desired one of the open position and the closed position is the closed position.

According to some embodiments of the present technology, the intermediate position is or is approximately halfway between the open position and the closed position.

According to some embodiments of the present technology, in the intermediate position the at least one exhaust valve does not affect port timing of the internal combustion engine and is exposed to exhaust gas flow.

According to some embodiments of the present technology, the at least one exhaust valve is determined to have failed to reach the desired one of the open position and the closed position if the position of the at least one exhaust valve is at more than a predetermined distance from the desired one of the open position and the closed position.

According to some embodiments of the present technology, the predetermined distance is greater when the desired one of the open position and the closed position is the open position than when the desired one of the open position and the closed position is the closed position.

According to some embodiments of the present technology, the predetermined distance is at least 5 percent of a total distance between the open position and the closed position.

According to some embodiments of the present technology, the method further comprises: entering a fault operation mode if, in response to the actuator attempting to move the at least one exhaust valve to the desired one of the open position and the closed position, the at least one exhaust valve has moved by less than a predetermined amount.

According to some embodiments of the present technology, the predetermined amount corresponds to 5 percent of a total distance between the open position and the closed position.

According to some embodiments of the present technology, the method further comprises limiting performance of the engine provided with the exhaust valve system when in the fault operation mode.

In another aspect, the present technology provides an exhaust valve assembly for a two-stroke internal combustion engine having a housing that is to be mounted to the engine block of the engine, an electric actuator is disposed in the housing and is connected to at least one reciprocating exhaust valve that extends in part into the housing. The electric motor provides for versatile control of the exhaust valves. By locating the electric motor inside the housing, the electric motor is partly isolated from engine heat and vibration. In some embodiments, the electric motor is mounted to the housing via a vibration absorbing mount further isolating the electric actuator from vibrations. In some embodiments, the at least one exhaust valve is connected to the electric actuator via a vibration absorbing mount further isolating the electric actuator from vibrations.

According to one aspect of the present technology, there is provided an exhaust valve assembly for a two-stroke internal combustion engine. The exhaust valve assembly has: a housing adapted for connection to an engine block of the two-stroke internal combustion engine; an electric actuator comprising an electric motor, the electric motor being disposed in the housing; and at least one reciprocating exhaust valve operatively connected to the electric actuator, the at least one exhaust valve being linearly movable by the electric motor, and a portion of the at least one exhaust valve being disposed in the housing.

In some embodiments of the present technology, each exhaust valve of the at least one exhaust valve has a blade and a shaft connected to the blade. The portion of the at least one exhaust valve being disposed in the housing is a portion of the shaft.

In some embodiments of the present technology, the housing includes: a housing body; and a base plate connected to the housing body. The electric motor is disposed in a volume defined between the housing body and the base plate. The base plate is disposed between the housing body and the blade of each of the at least one exhaust valve.

In some embodiments of the present technology, the shaft of each of the at least one exhaust valve extends through the base plate.

In some embodiments of the present technology, at least one pair of exhaust valve passage fillers connected to the base plate for filling a portion of at least one exhaust valve passage defined by the engine block for receiving the at least one exhaust valve. The least one pair of exhaust valve passage fillers is disposed between the base plate and the blade of the at least one exhaust valve. The shaft of the at least one exhaust valve extends between the exhaust valve passage fillers of the at least one pair of exhaust valve passage fillers.

In some embodiments of the present technology, the at least one pair of exhaust valve passage fillers are integral with the base plate.

In some embodiments of the present technology, for each exhaust valve of the at least one exhaust valve, the housing includes a seal disposed between the base plate and the shaft of the at least one exhaust valve.

In some embodiments of the present technology, a vibration absorbing mount connects the electric actuator to the housing.

In some embodiments of the present technology, the housing includes: a housing body; and a cover connected to the housing body. The housing body is disposed at least in part between the blade of the at least one valve and the cover. The vibration absorbing mount connects the electric actuator to the cover.

In some embodiments of the present technology, the electric actuator also has a lead screw operatively connecting the at least one exhaust valve to an output shaft of the electric motor for converting rotation of the output shaft to linear motion.

In some embodiments of the present technology, the lead screw and the output shaft are parallel to each other.

In some embodiments of the present technology, a vibration absorbing mount connects the at least one exhaust valve to the electric actuator.

In some embodiments of the present technology, a tie bar is connected to the electric actuator. The at least one exhaust valve is a plurality of exhaust valves. Each exhaust valve of the plurality of exhaust valves is operatively connected to the electric actuator via the tie bar.

In some embodiments of the present technology, each exhaust valve of the plurality of exhaust valves has a blade and a shaft connected to the blade. The shaft of each exhaust valve of the plurality of exhaust valves is connected to the tie bar.

In some embodiments of the present technology, a plurality of vibration absorbing mounts connects the shafts of the plurality of exhaust valves to the tie bar.

According to another aspect of the present technology, there is provided a two-stroke internal combustion engine having an engine block. The engine block defines at least one cylinder; at least one exhaust passage communicating with the at least one cylinder; and at least one exhaust valve passage communicating with the at least one exhaust passage. The engine also has at least one piston disposed in the at least one cylinder; and the exhaust valve assembly of any one of the above aspect and embodiments connected to the engine block. The at least one exhaust valve is disposed at least in part in the at least on exhaust valve passage.

In some embodiments of the present technology, the housing of the exhaust valve assembly is fastened to the engine block.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology will be described with reference to a two-stroke, direct injection, internal combustion engine having a vertically oriented crankshaft for use in a marine outboard engine. However, it is contemplated that the present technology could be used in other types of two-stroke internal combustion engines such as those having longitudinally or laterally oriented crankshaft, and those having semi-direct injection or being carbureted.

Figure 1A:
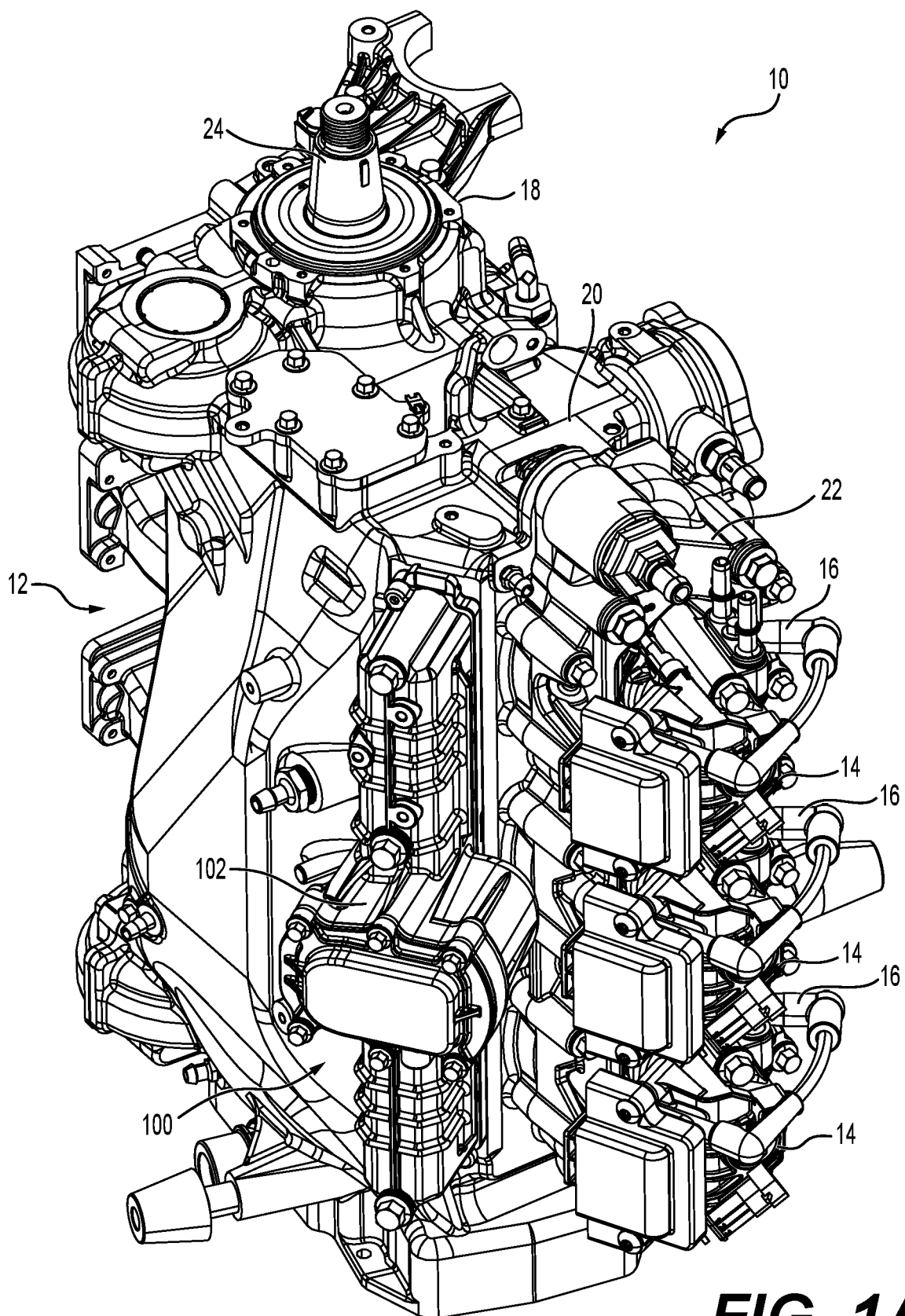
FIG. 1A is a perspective view taken from a rear, left side of components of a two-stroke internal combustion engine for a marine outboard engine.
Figure 1B:
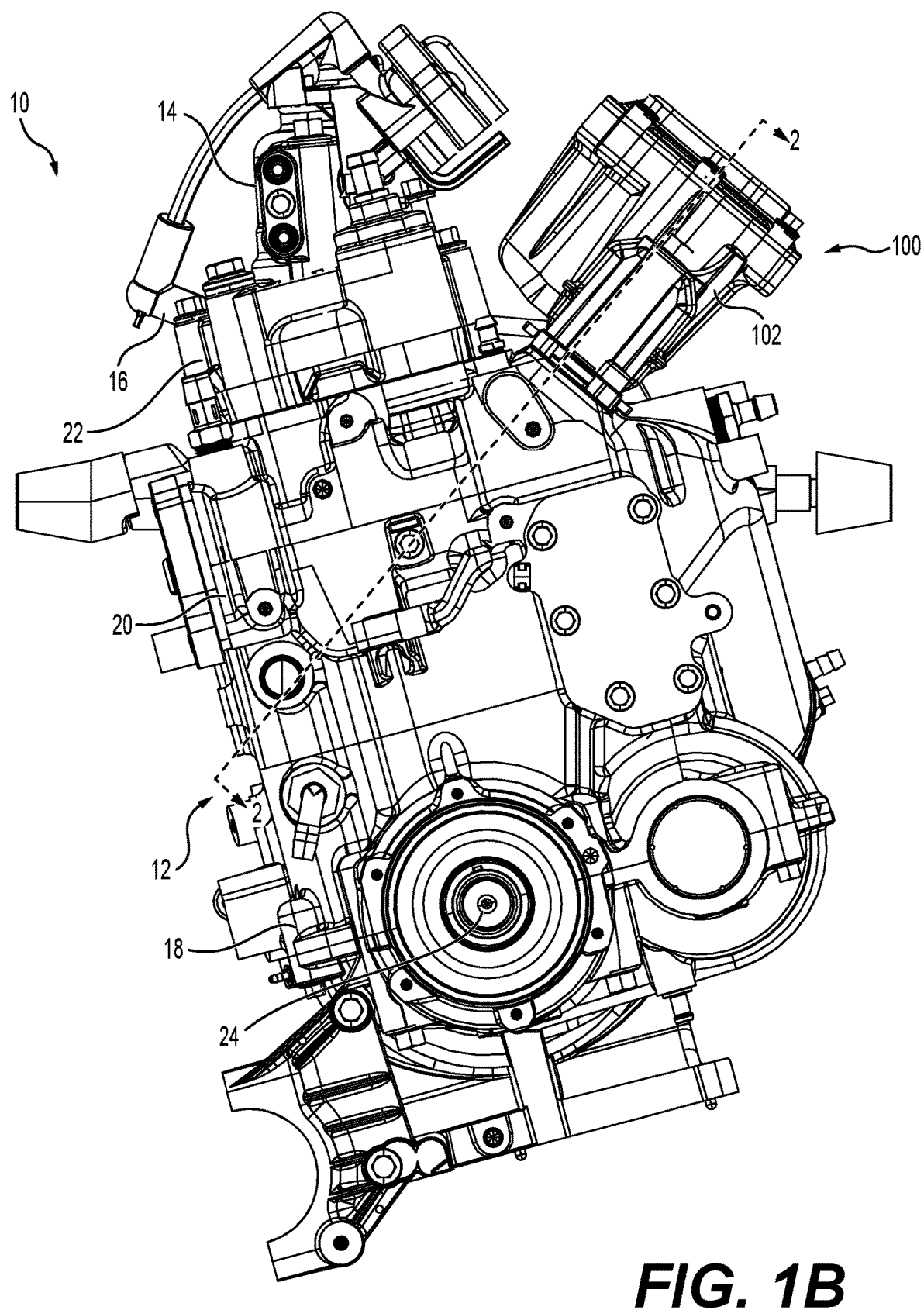
FIG. 1B is a top plan view of the components of the two-stroke internal combustion engine of FIG. 1A.
Figure 2:
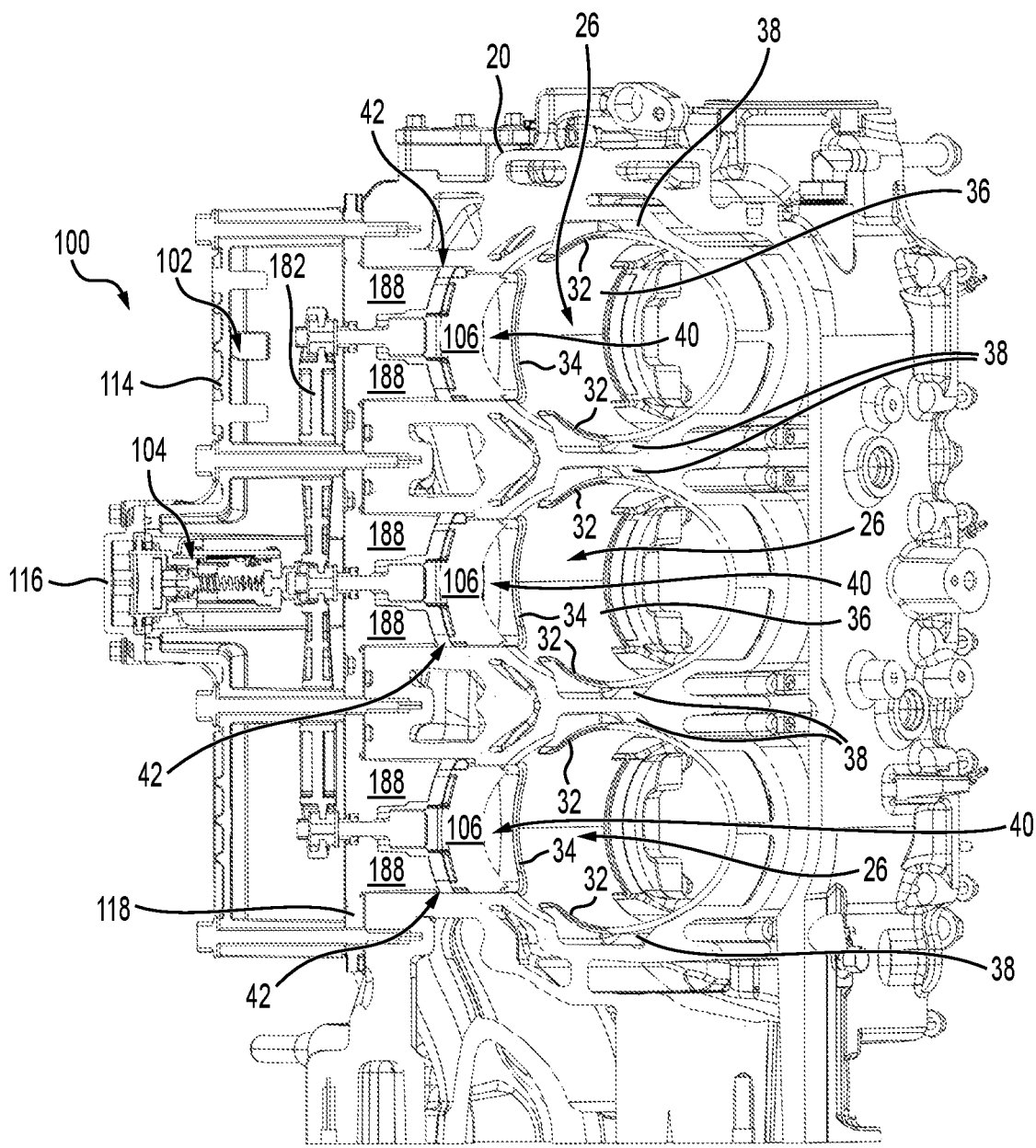
FIG. 2 is a partial cross-sectional view of the engine of FIG. 1A taken through line 2-2 of FIG. 1B.

With reference to FIGS. 1A, 1B and 2, a two-stroke internal combustion engine 10 has an engine block 12 to which are connected three direct fuel injectors 14, three spark plugs 16 and an exhaust valve assembly 100. The engine block 12 has a crankcase 18, a cylinder block 20 and a cylinder head 22. The cylinder block 20 is disposed between the crankcase 18 and the cylinder head 22. The fuel injectors 14 and the spark plugs 16 are connected to the cylinder head 22. The exhaust valve assembly 100 is connected to the cylinder block 20 as will be described in greater detail below. It is contemplated that the exhaust valve assembly 100 could additionally or alternatively be connected to the cylinder head 22. As can be seen in FIG. 2, the exhaust valve assembly 100 has a housing 102, an exhaust valve actuator in the form of an electric actuator 104 housed in the housing 102 and three reciprocating exhaust valves 106 operatively connected to the electric actuator 104, as will be described in greater detail below.

A crankshaft 24 is rotationally supported in the crankcase 18. An upper end of the crankshaft 24 extends from a top of the crankcase 18, as shown in FIGS. 1A and 1B, to be connected to a flywheel and magneto assembly (not shown). A lower end of the crankshaft 24 extends from a bottom of the crankcase 18 to be connected to a driveshaft (not shown) of the marine outboard engine.

The cylinder block 20 defines three cylinders 26 (FIG. 2), which will be described in more detail below. Three pistons 28 (one of which is partially shown in FIG. 3) are received in the three cylinders 26 (i.e. one piston 28 per cylinder 26). It is contemplated that the cylinder block 20 could define only one cylinder 26, two cylinders 26 or more than three cylinders 26, in which case the engine 10 would have a corresponding number of fuel injectors 14, spark plugs 16, exhaust valves 106 and pistons 28.

The pistons 28 are connected to the crankshaft 24 by connecting rods (not shown). During operation of the engine 10, combustion of fuel-air mixture in the cylinders 26 causes the pistons 28 to turn the crankshaft 24, and the connections of the pistons 28 to the crankshaft 24 cause the pistons 28 to reciprocate inside their respective cylinders 26.

The engine 10 has many other components which are not essential to the understanding of the present technology. As such these other components will not be described herein but would be known to a person skilled in the art of two-stroke internal combustion engines.

Figure 3:
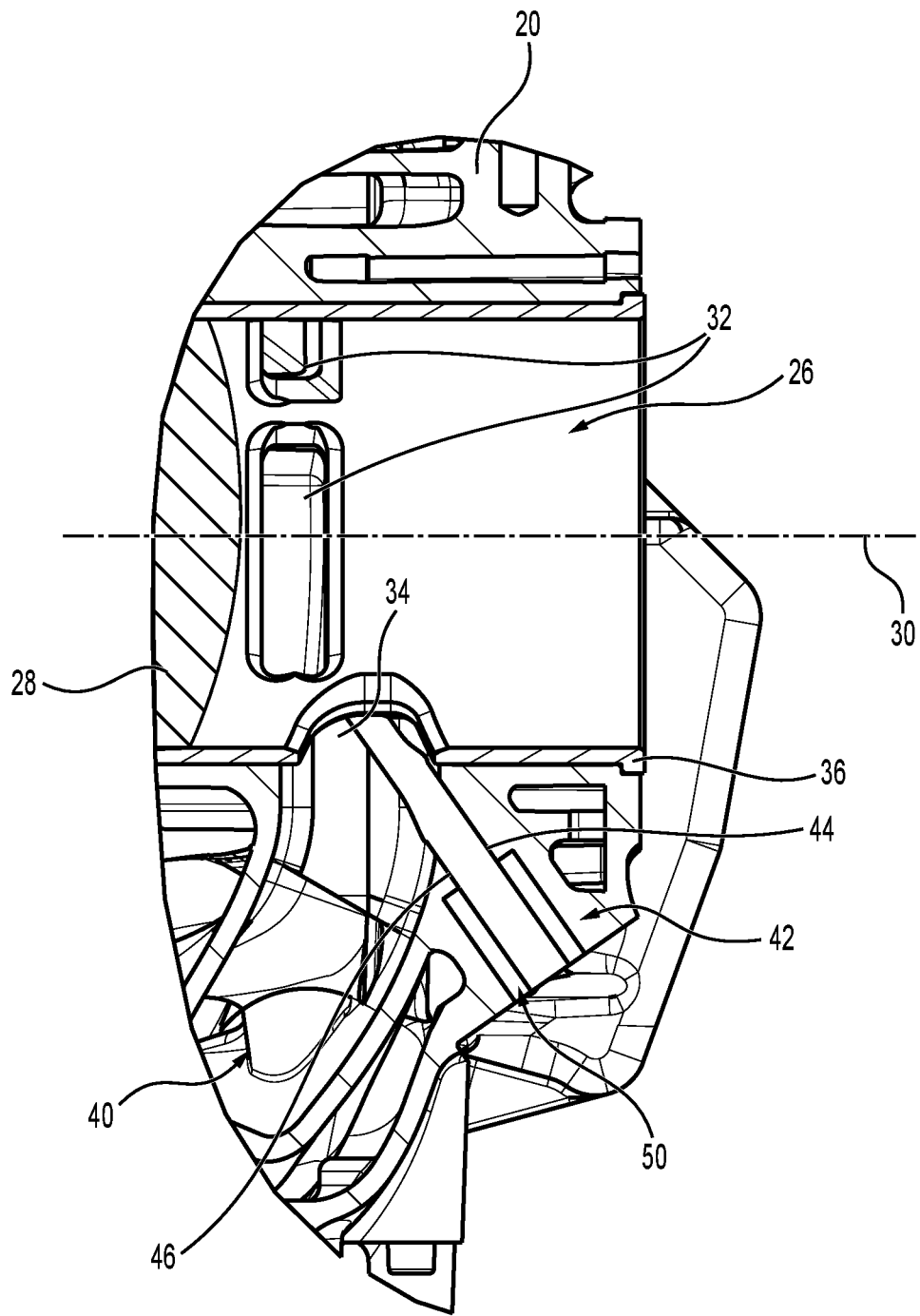
FIG. 3 is a partial cross-sectional view of a cylinder block and piston of the engine of FIG. 1A taken through a horizontal plane passing through a center of a cylinder of the cylinder block.
Figure 6A:
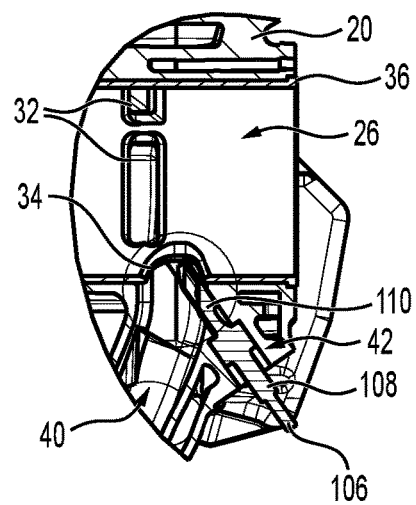
FIG. 6A is the cross-sectional view of FIG. 3 with the piston removed and with the reciprocating exhaust valve shown in an actuated position.
Figure 6B:
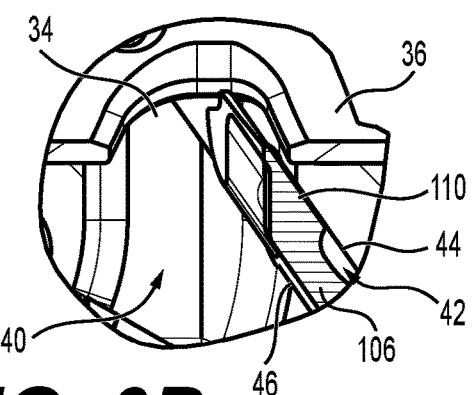
FIG. 6B is a close-up of a region of FIG. 6A near an end of the exhaust valve.
Figure 7:
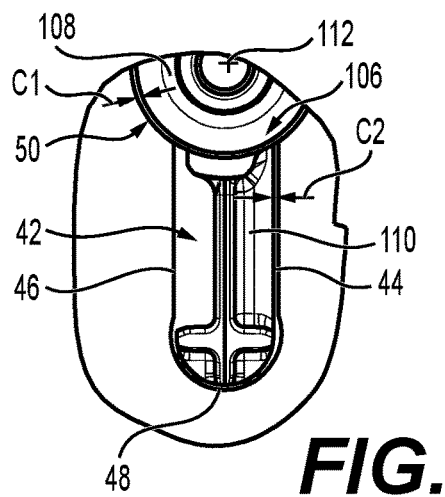
FIG. 7 is a close-up view taken from a shaft end of the exhaust valve of FIG. 4A showing a clearance between the exhaust valve and walls of an exhaust valve passage.
Figure 8:
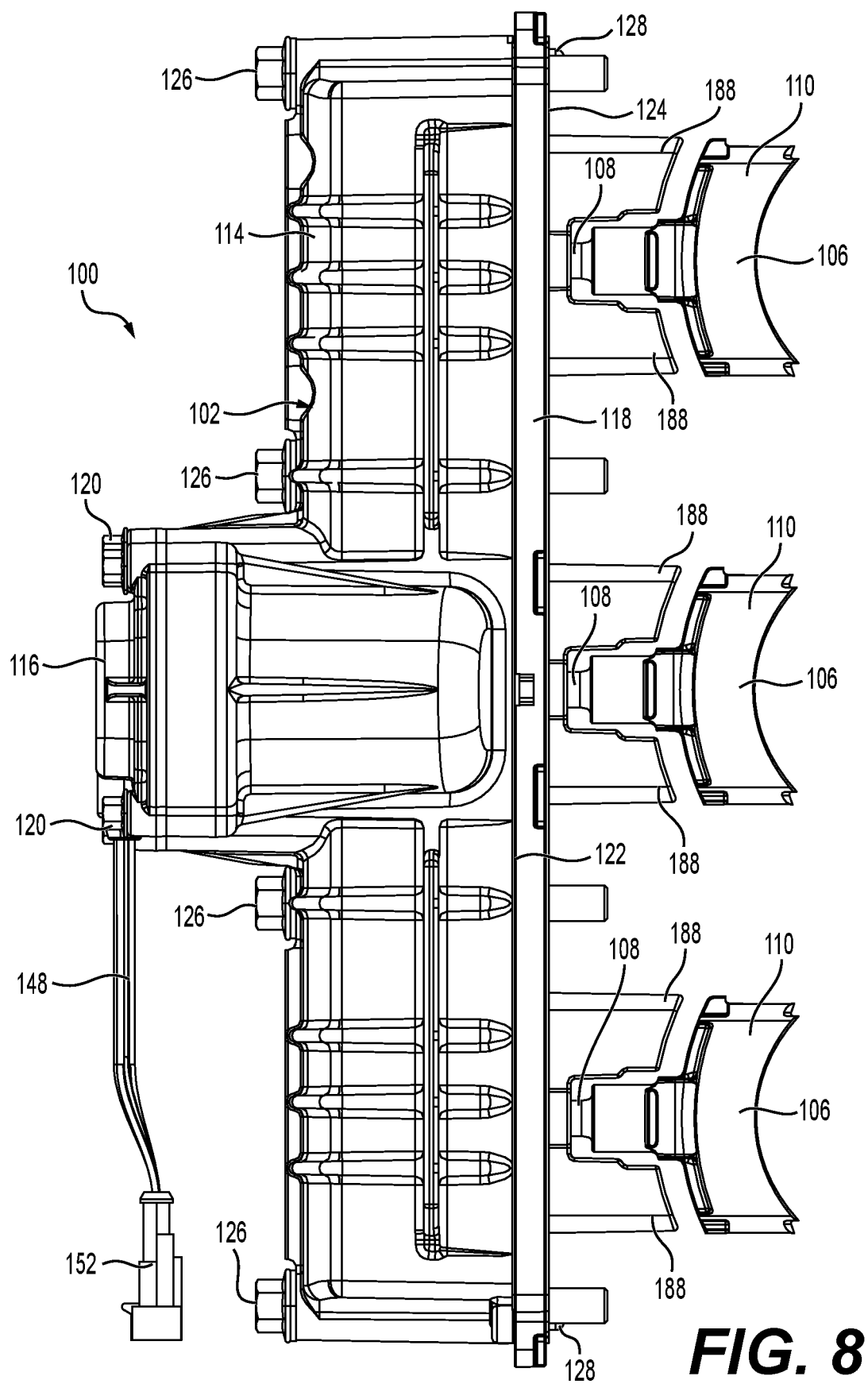
FIG. 8 is an elevation view of a side of an exhaust valve assembly of the engine of FIG. 1A.
Figure 9:
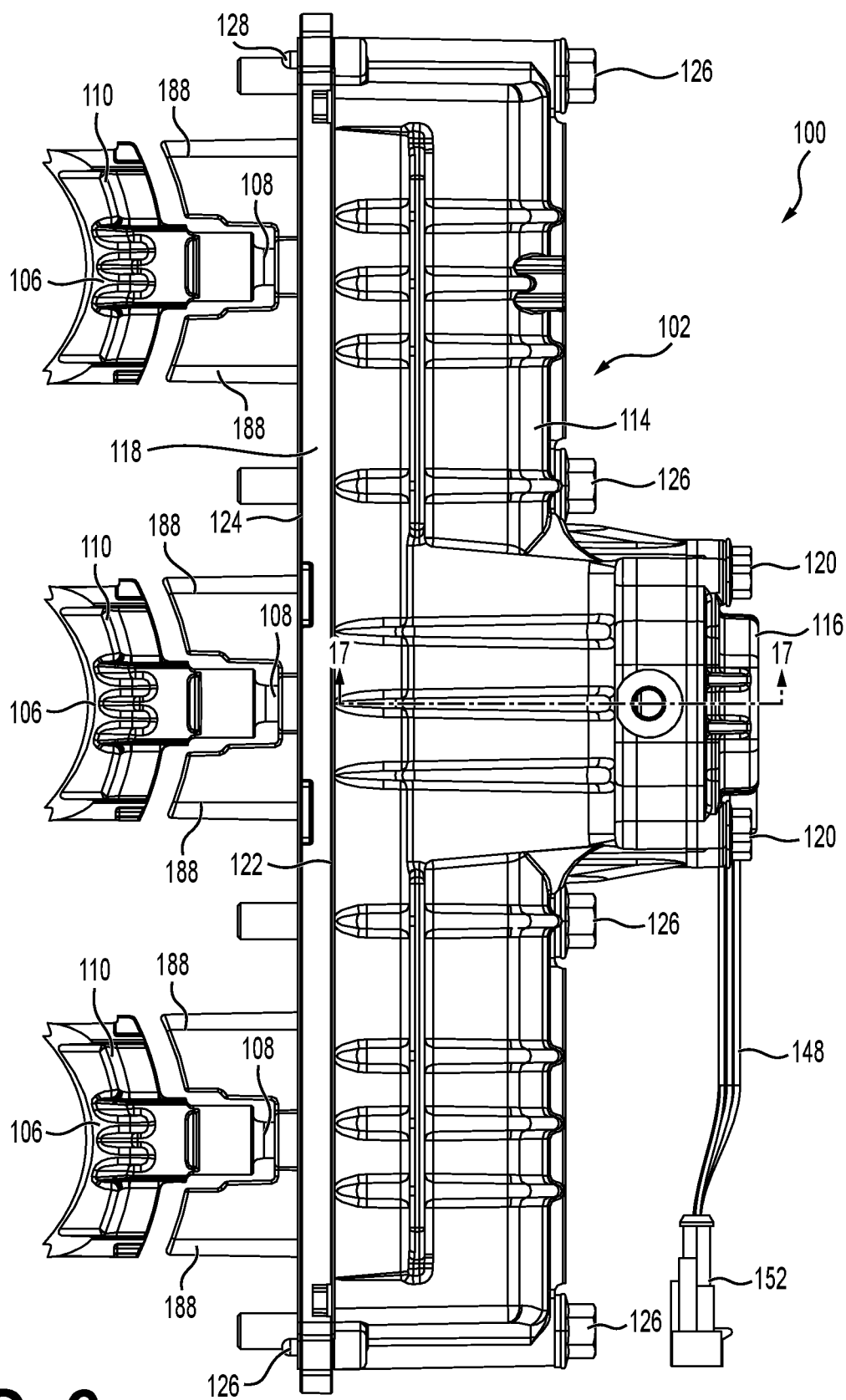
FIG. 9 is an elevation view of an opposite side of the exhaust valve assembly of FIG. 8.
Figure 10:
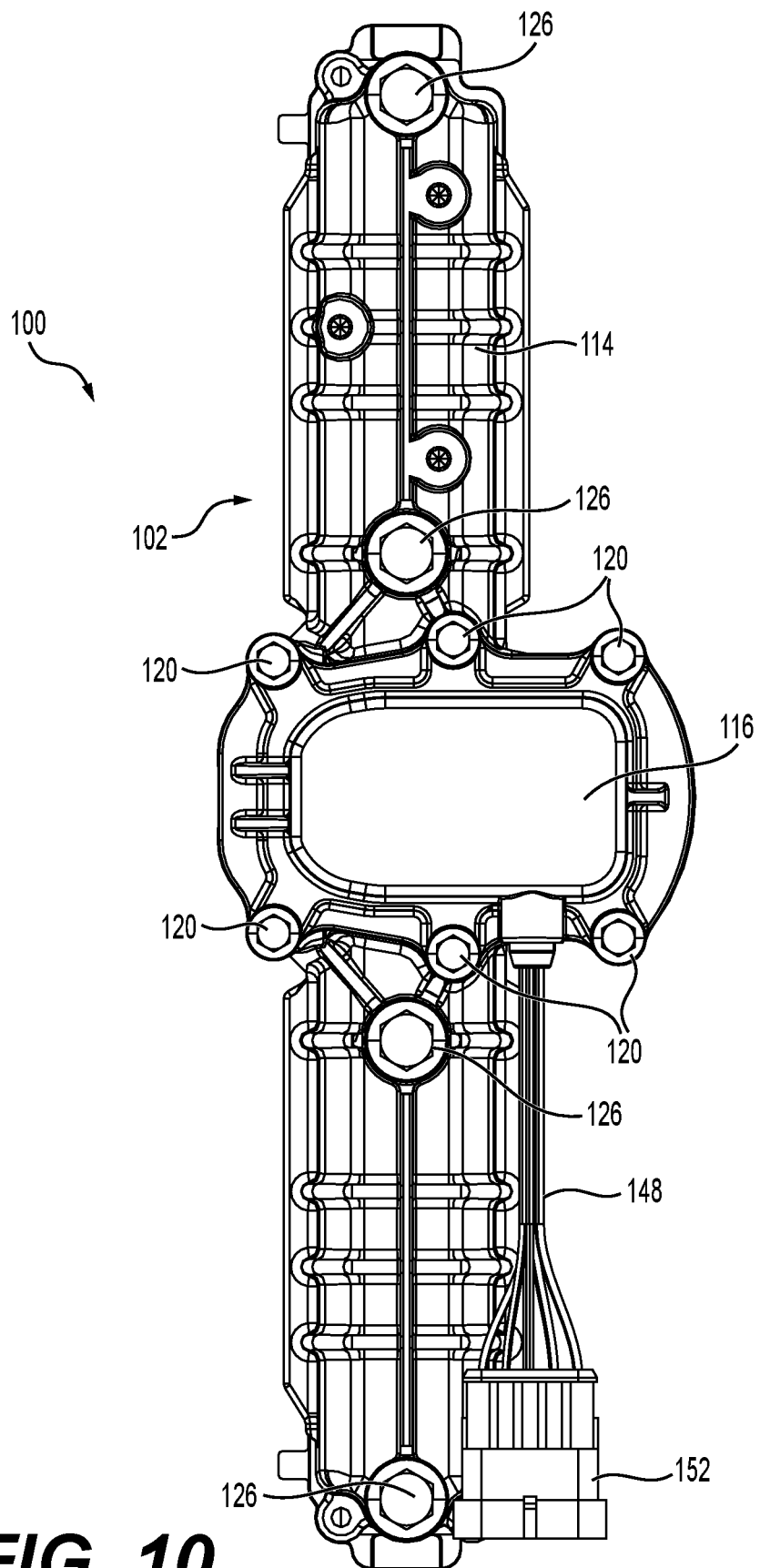
FIG. 10 is an elevation view of an end of the exhaust valve assembly of FIG. 8.
Figure 11:
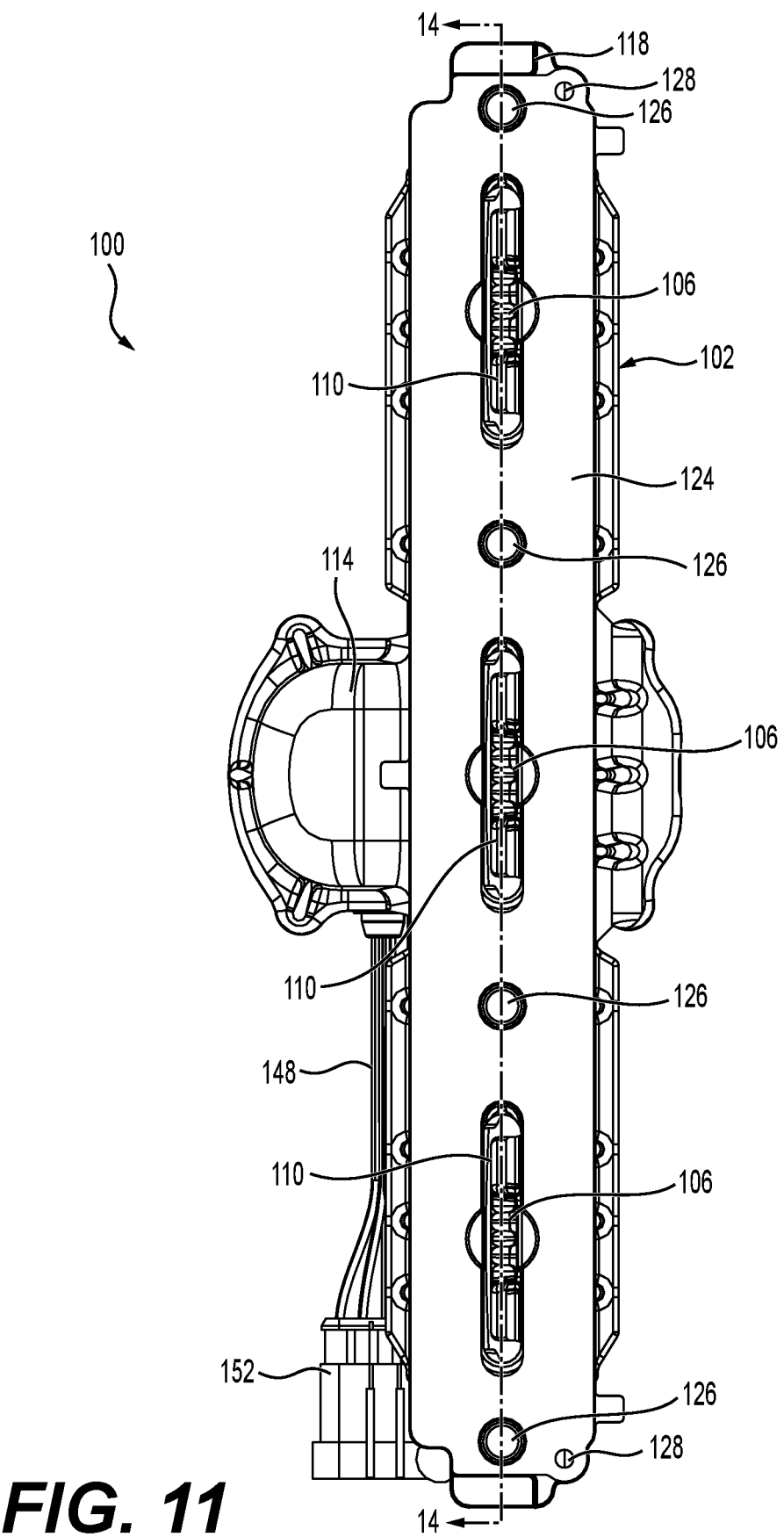
FIG. 11 is an elevation view of an opposite, engine facing, side of the exhaust valve assembly of FIG. 8.
Figure 12:
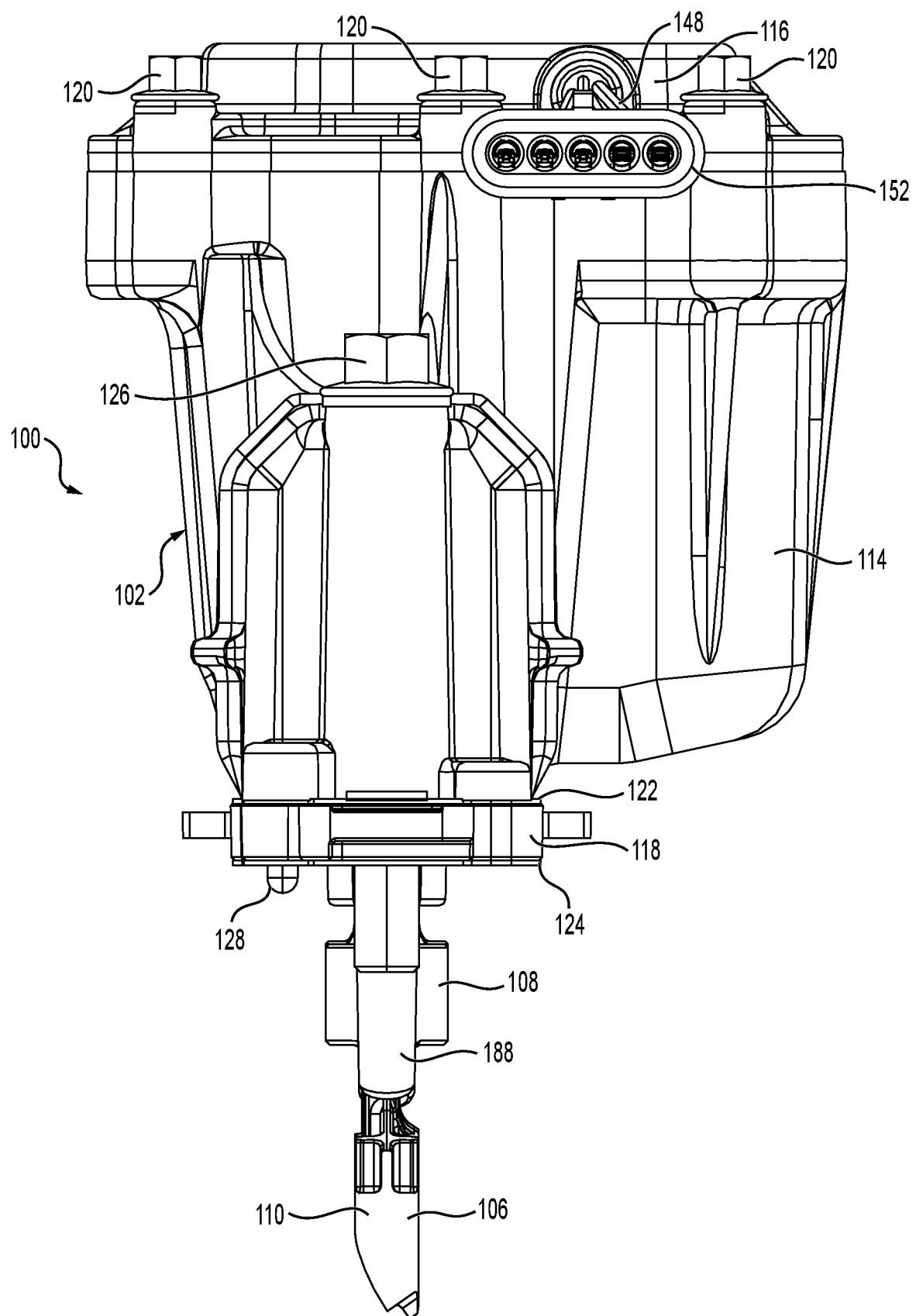
FIG. 12 is a bottom plan view of the exhaust valve assembly of FIG. 8.
Figure 13:
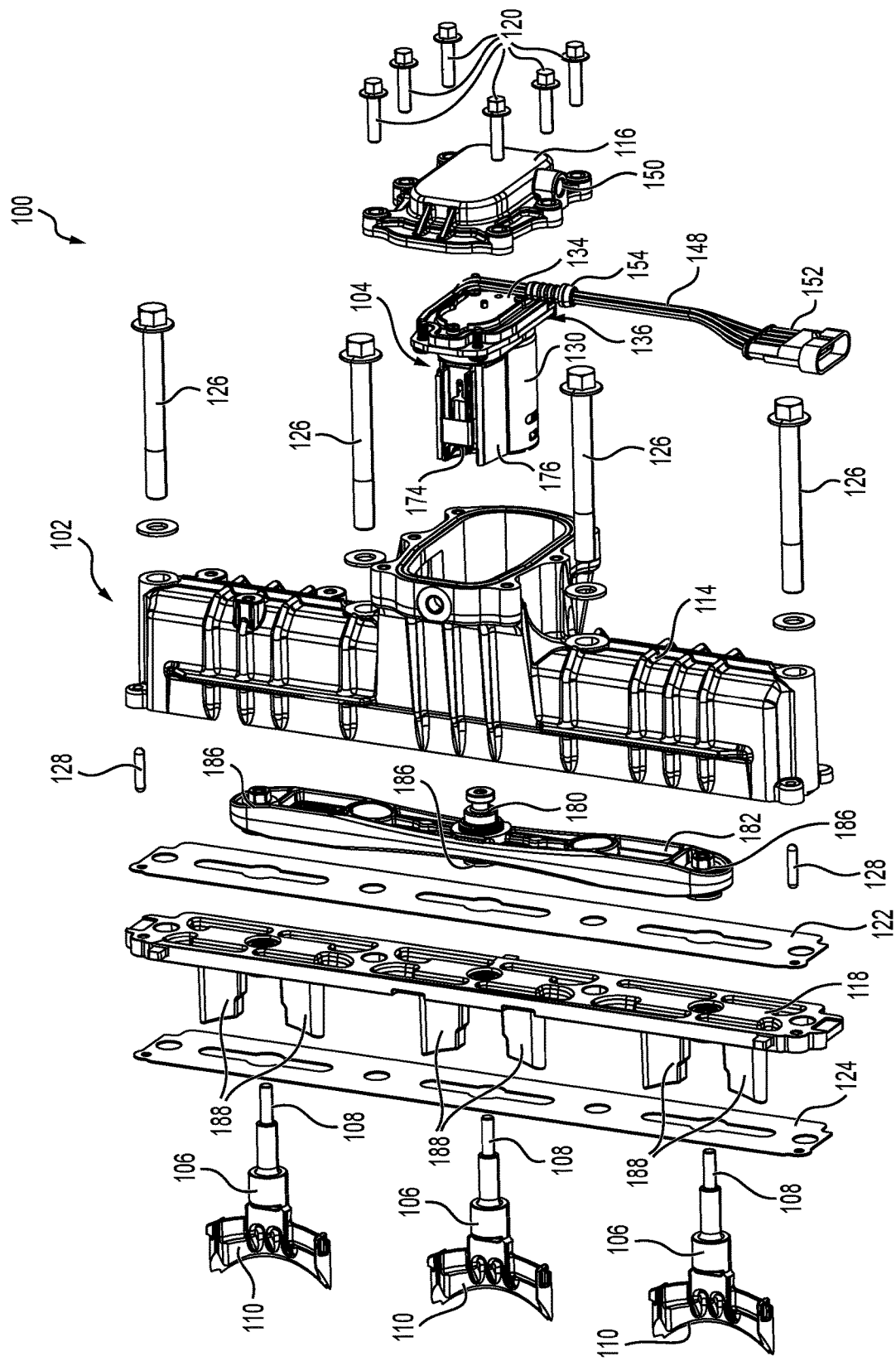
FIG. 13 is an exploded view of the exhaust valve assembly of FIG. 8.

With reference to FIGS. 2 and 3, one of the cylinders 26 and associated features will be described in more detail. The cylinder 26 defines a cylinder axis 30 along which the piston 28 reciprocates. The cylinder 26 defines four intake ports 32 (two of which are shown in FIG. 3) through which air can enter the cylinder 26. The cylinder 26 also defines an exhaust port 34 through which exhaust gases can leave the cylinder 26. A cylinder liner 36 is provided in the cylinder 26. The cylinder liner 36 defines ports corresponding to the ports 32, 34. As best seen in FIG. 2, the cylinder block 20 defines transfer passages 38 that fluidly communicate the intake ports 32 with the volume defined by the crankcase 18 to permit the transfer of air from the crankcase 18 to the cylinder 26. As best seen in FIG. 3, the cylinder block 20 defines an exhaust passage 40 that extends from the exhaust port 34 and fluidly communicates the cylinder 26 with an exhaust system (not shown) of the engine 10. As can also be seen in FIG. 3, the cylinder block 20 also defines an exhaust valve passage 42 that communicates with and extends at an angle to the exhaust passage 40. As can be seen in FIGS. 4A to 7, the exhaust valve passage 42 receives one of the exhaust valves 106 of the exhaust valve assembly 100 therein. The exhaust valve passage 42 has a wall 44 and a wall 46 that are connected to each other at their ends by two arcuate walls 48 (one of which is shown in FIG. 7). The wall 44 is closer to the cylinder head 22 in the direction defined by the cylinder axis 30. The exhaust valve passage 42 also has a cylindrical portion 50.

The other two cylinders 26 are identical and have corresponding transfer passages 38, exhaust passages 40 and exhaust valve passages 42. Where visible in FIG. 2, the corresponding features of the other two cylinders 26 have been labeled with the same reference numerals.

Figure 4A:
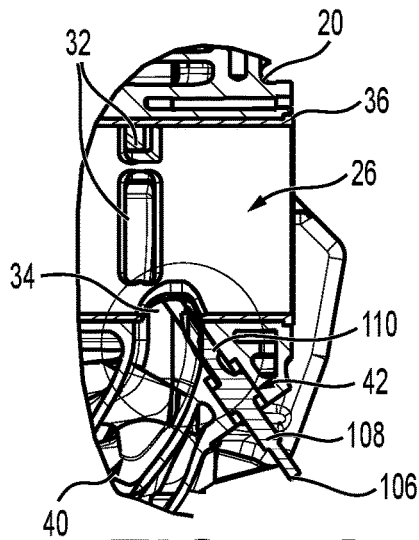
FIG. 4A is the cross-sectional view of FIG. 3 with the piston removed and with a reciprocating exhaust valve shown in a retracted position.
Figure 4B:
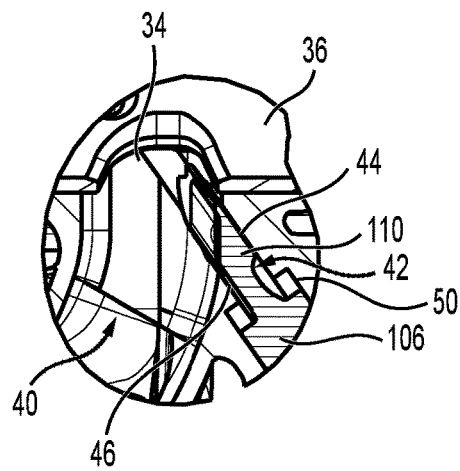
FIG. 4B is a close-up of a region of FIG. 4A near an end of the exhaust valve.
Figure 5:
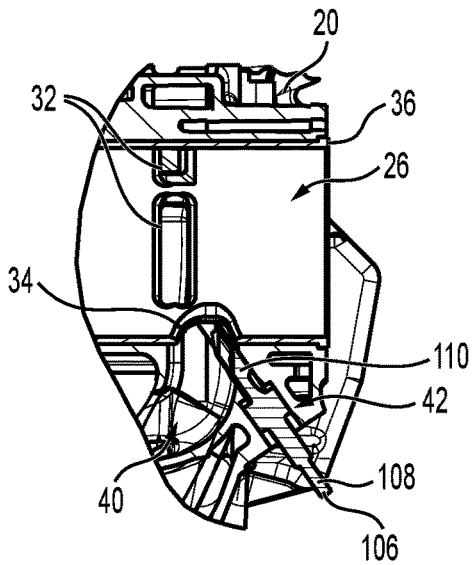
FIG. 5 is the cross-sectional view of FIG. 3 with the piston removed and with the reciprocating exhaust valve shown in an intermediate position.
Figure 14:
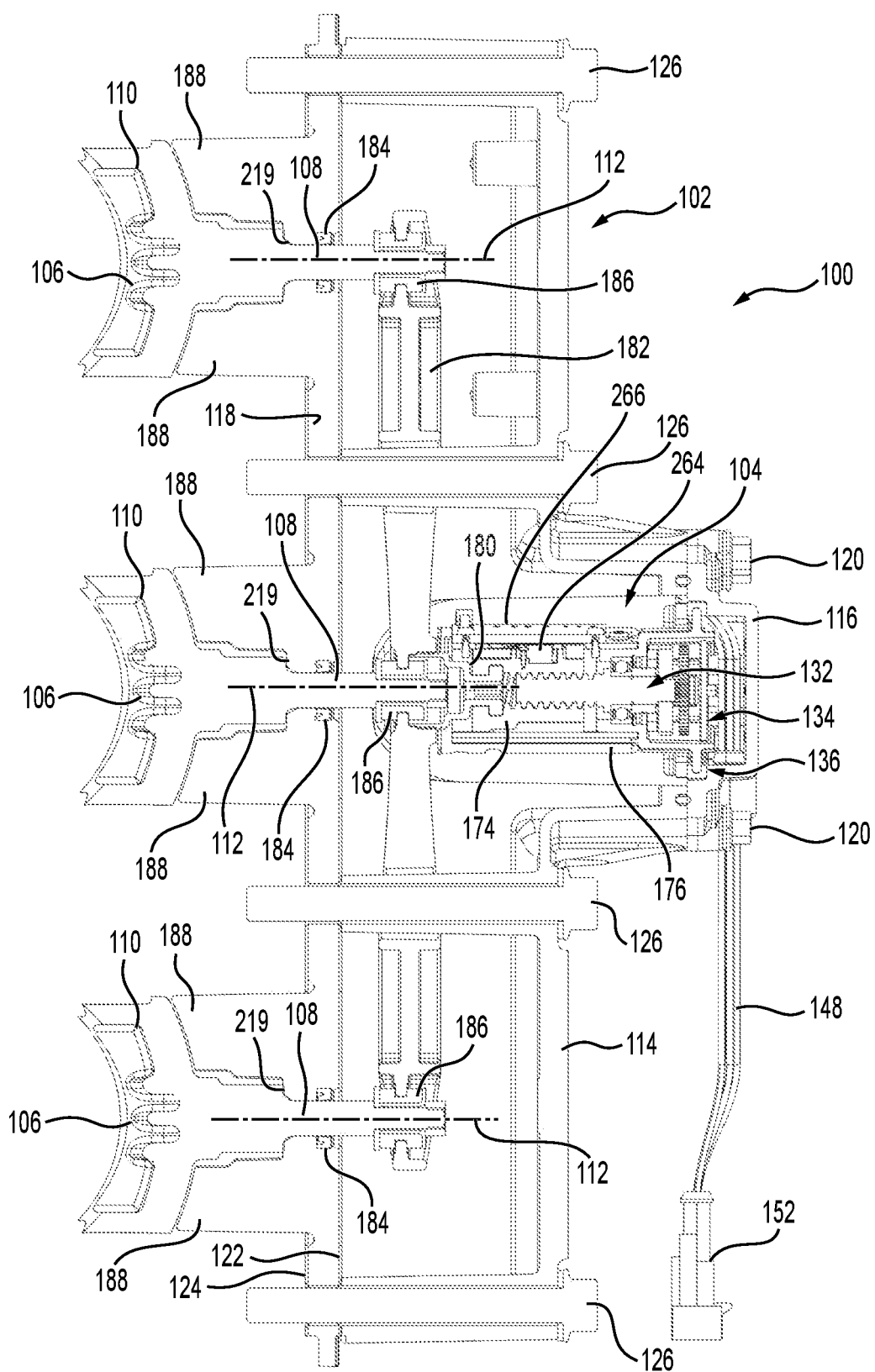
FIG. 14 is a cross-section view of the exhaust valve assembly of FIG. 8 taken through line 14-14 of FIG. 11 with the exhaust valves in the retracted position.

Each reciprocating exhaust valve 106 has a shaft 108 and a blade 110 connected to the shaft 108. As can be seen in FIG. 2, the shafts 108 of the exhaust valves 106 are operatively connected to the electric actuator 104. The shafts 108 extend in the cylindrical portions 50 of their corresponding exhaust valve passages 42 as can be seen in FIGS. 4A to 7 and 25 for one of the exhaust valves 106. The blades 110 are received between the walls 44, 46 of their corresponding exhaust valve passages 42 as can also be seen in FIGS. 4A to 7 and 25 for one of the exhaust valves 106. The electric actuator 104 selectively slides the exhaust valves 106 inside their respective exhaust valve passages 42 between various positions along their respective reciprocation axes 112 (FIG. 14). Each reciprocation axis 112 is defined by the shaft 108 of the corresponding exhaust valve 106. In the present embodiment, all of the exhaust valves 106 are moved simultaneously by the electric actuator 104. In the present embodiment, each exhaust valve 106 has a retracted position (also referred to as an open position, FIGS. 4A, 4B, 14), an intermediate position (FIG. 5), and an actuated position (also referred to as a closed position, FIGS. 6A, 6B, 8, 9, 12, 15). With reference to FIGS. 4A and 4B, in the retracted position, the blade 110 of the exhaust valve 106 is almost completely inside its corresponding exhaust valve passage 42 so as not to obstruct the flow of exhaust gases through the exhaust passage 40. The retracted position of the exhaust valve 106 is the position at which the exhaust port 34 opens earliest in the engine cycle as the piston 28 travels away from the cylinder head 22 and, correspondingly, at which the piston 28 takes the longest to completely close the exhaust port 34 as it travels toward the cylinder head 22. With reference to FIGS. 6A and 6B, in the actuated position, the blade 110 of the exhaust valve 106 extends partially out of its corresponding exhaust valve passage 42 so as to partially obstruct the flow of exhaust gases through the exhaust passage 40. The actuated position of the exhaust valve 106 is the position at which the exhaust port 34 opens latest as the piston 28 travels away from the cylinder head 22 and, correspondingly, at which the piston 28 takes the shortest to completely close the exhaust port 34 as it travels toward the cylinder head 22 since the exhaust port 34 is already effectively partially closed by the blade 110 of the exhaust valve 106. The intermediate position of the exhaust valve 106 shown in FIG. 5 is, as its name suggest, a position intermediate the retracted and actuated positions. In the intermediate position, the blade 110 of the exhaust valve 106 partially obstructs the flow of exhaust gases through the exhaust passage 40, but less than in the actuated position, so as to be more exposed to the hot exhaust gases than in the retracted position while not affect the port timing of the engine 10. It is contemplated that the exhaust valve 106 could have multiple intermediate positions, each providing a different degree of obstruction of the exhaust passage 40.

Turning now to FIGS. 8 to 17, the exhaust valve assembly 100 will be described in more detail. As previously described, the exhaust valve assembly 100 includes a housing 102, an electric actuator 104 and three reciprocating exhaust valves 106.

The housing 102 includes a housing body 114, a cover 116 and a base plate 118. As can be seen, the housing body 114 is between the cover 116 and the base plate 118, and the base plate 118 is between the housing body 114 and the blades 110 of the exhaust valves 106. When the exhaust valve assembly 100 is mounted to the cylinder block 20, the base plate 118 is disposed between the housing body 114 and the cylinder block 20.

The housing body 114 has a larger central section to receive the electric actuator 104 therein. The central section of the housing body 114 defines an aperture that is closed by the cover 116. The cover 116 is fastened to the housing body 114 by six bolts 120. A sealing member 122 is disposed between the housing body 114 and the base plate 118. Another sealing member 124 is disposed between the base plate 118 and the cylinder block 20. Four bolts 126 extend through apertures defined the housing body 114, the base plate 118 and the sealing members 122, 124 and are threaded into four threaded apertures (not shown) defined in the cylinder block 20. As a result, the exhaust valve assembly 100 is fastened to the cylinder block 20. In order to help ensure that the exhaust valve assembly 100 is properly oriented and precisely positioned on the cylinder block 20, two pins 128 extend from two corners of the base plate 118 on a same side of the base plate 118. The pins 128 are received in two corresponding apertures (not shown) in the cylinder block 20. The two pins 128 extend through apertures defined in two corners of the housing body 114, the base plate 118 and the sealing members 122, 124.

Figure 16:
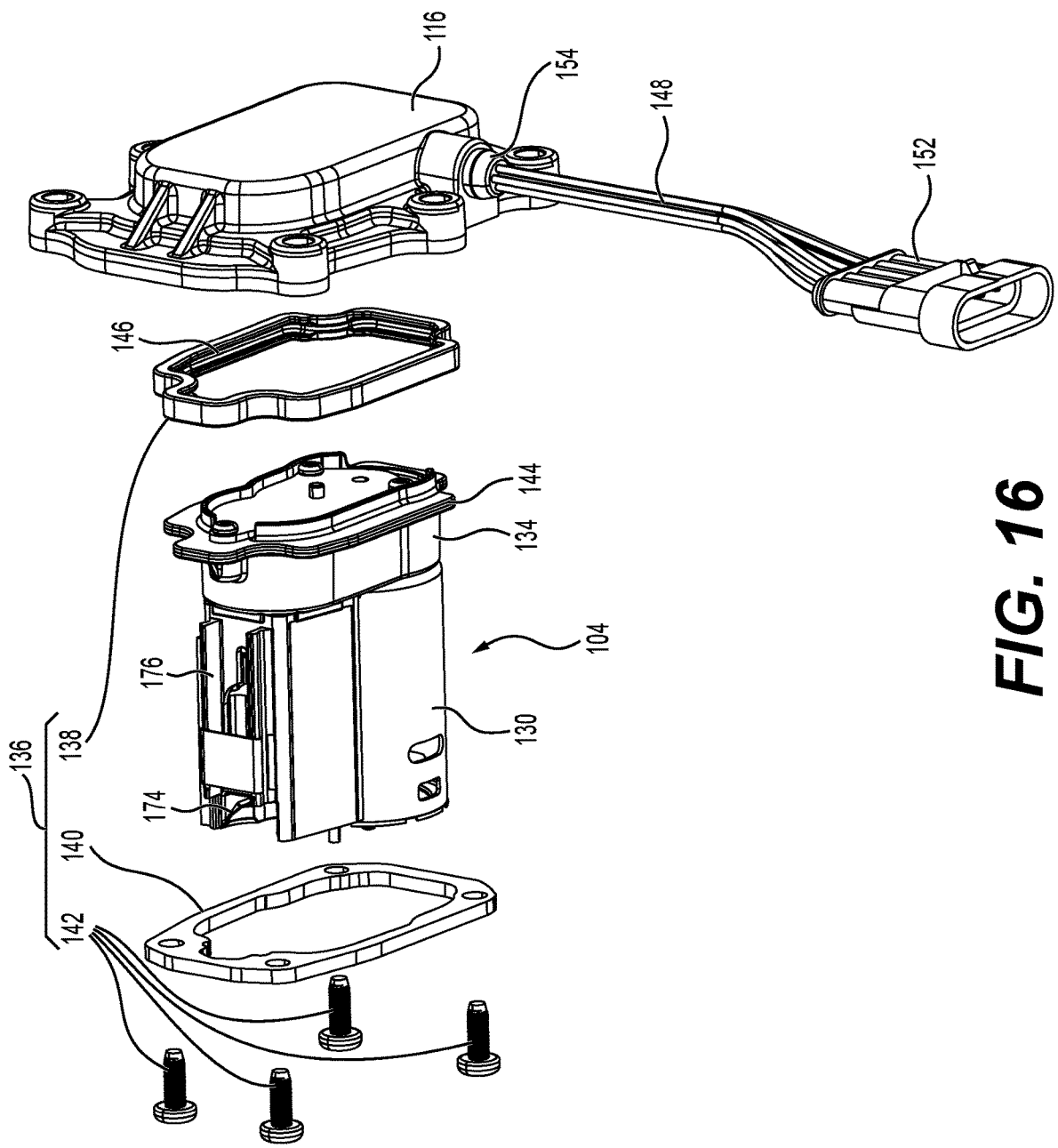
FIG. 16 is a partially exploded view of an electric actuator and of a cover of a housing of the exhaust valve assembly of FIG. 8.
Figure 17:
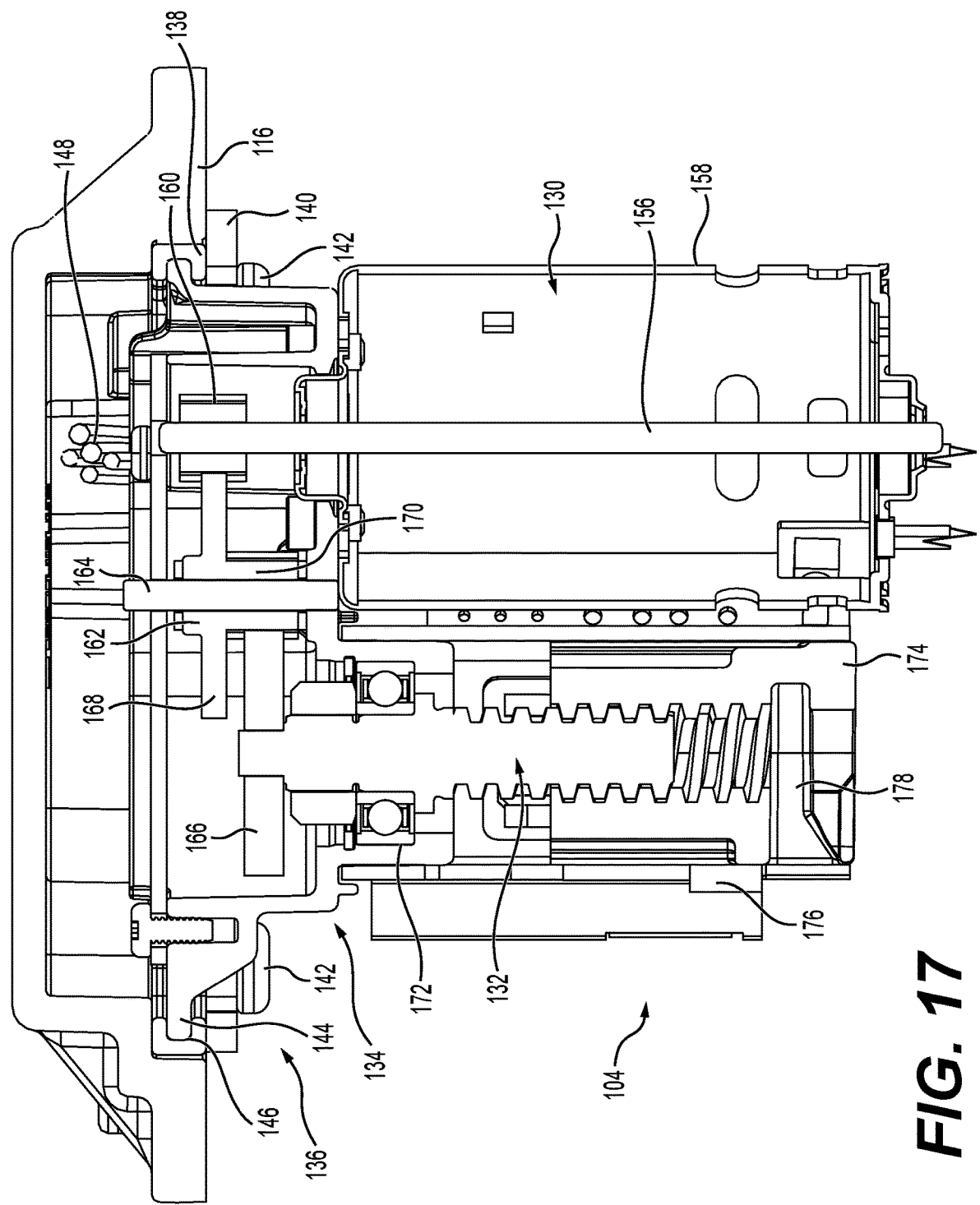
FIG. 17 is a cross-sectional view of the components of FIG. 16 taken through line 17-17 of FIG. 9.
Figure 18:
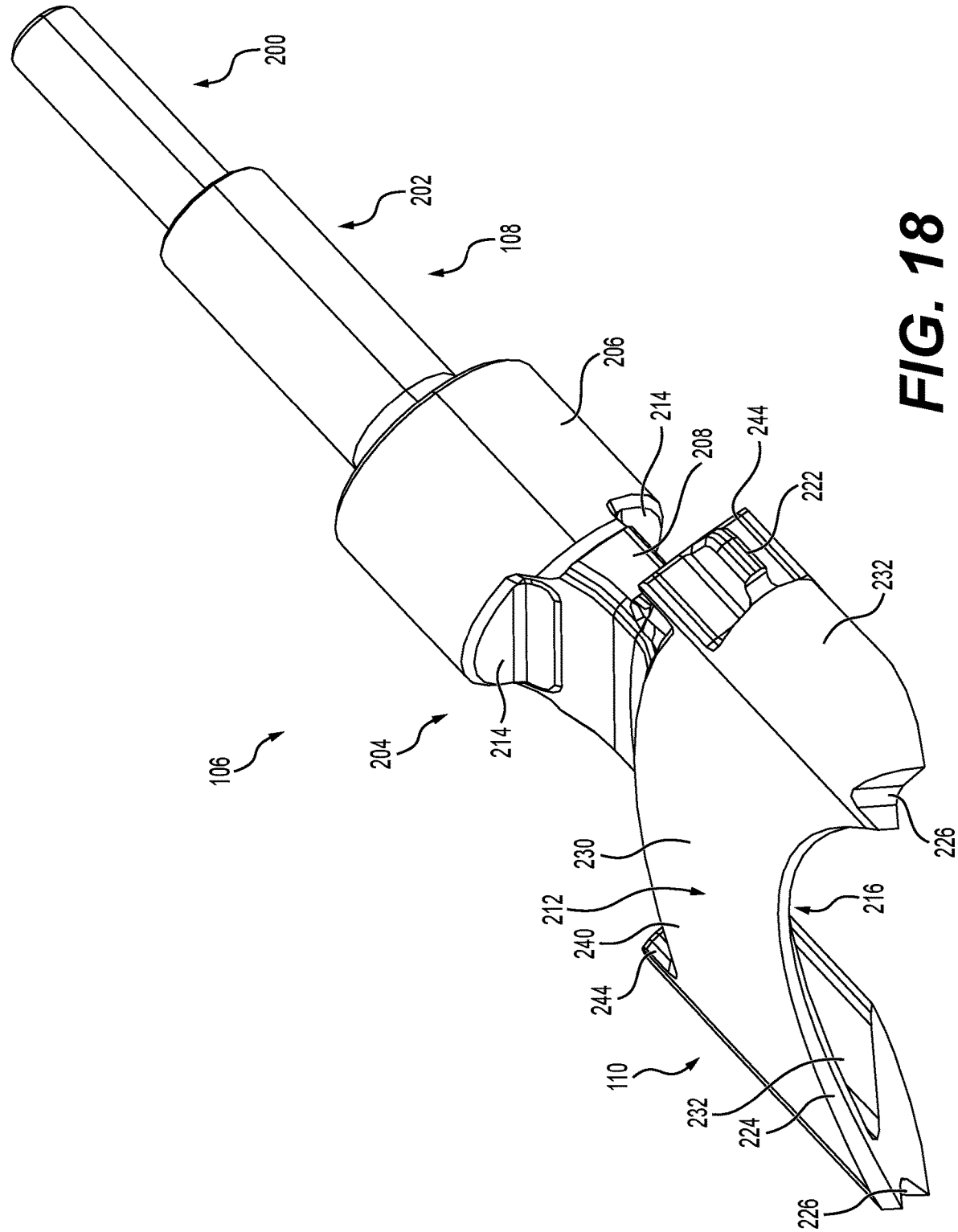
FIG. 18 is a front, left side perspective view of one of the exhaust valves of the engine of FIG. 1A.

With reference to FIGS. 16 and 17, the electric actuator 104 will be described in more detail. The electric actuator 104 includes an electric motor 130, a lead screw 132 and a gear box 134. The electric motor 130 and the lead screw 132 are disposed side-by-side and are connected to the gear box 134. The electric motor 130 is powered by a battery (not shown) charged by the magneto.

Figure 15:
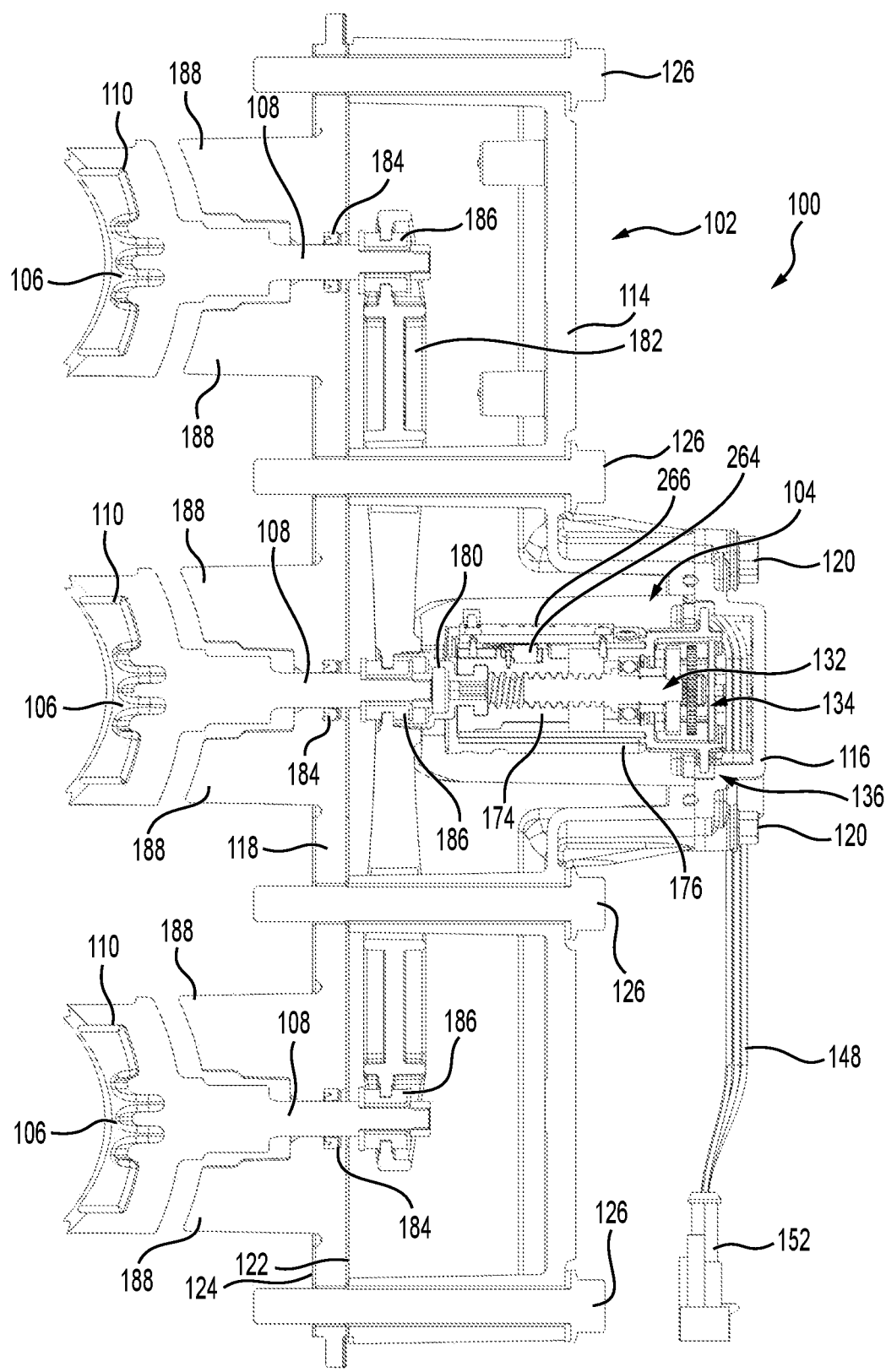
FIG. 15 is a cross-section view of the exhaust valve assembly of FIG. 8 taken through line 14-14 of FIG. 11 with the exhaust valves in the actuated position.

The electric actuator 104 is connected by a vibration absorbing mount 136 to an inner side of the cover 116 of the housing 102. Vibration absorbing mount 136 includes an elastomeric ring 138, a retaining ring 140 and four screws 142. The gear box 134 has a peripheral lip 144 that is received in an inner channel 146 of the elastomeric ring 138. As can be seen in FIG. 17, the elastomeric ring 138 is held between the inner side of the cover 116 and the retaining ring 140. The retaining ring 140 is fastened to the cover 116 by the screws 142. As a result, the gear box 134, and therefore the electrical actuator 104, is connected to cover 116 is such a way that the transmission of vibrations from the housing 102 to the electrical actuator 104 is reduced by the vibration absorbing mount 136. When the cover 116 with the electric actuator 104 attached to it is fastened to the housing body 114, the electric actuator 104 is disposed inside the volume defined by the housing body 114, the cover 116 and the base plate 118 as can be seen in FIGS. 14 and 15.

Figure 29:
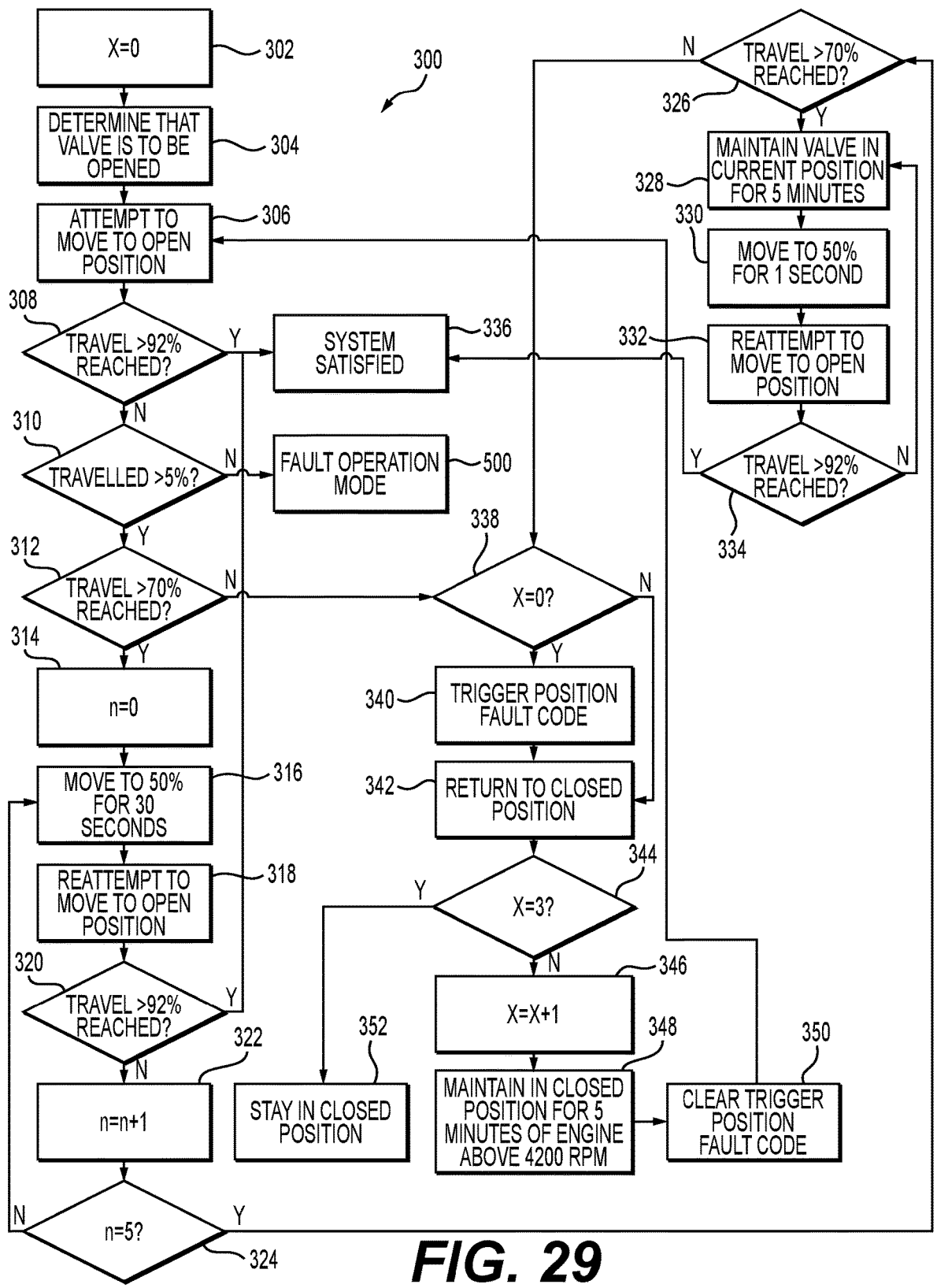
FIG. 29 is a logic diagram illustrating a method for cleaning the exhaust valves of the exhaust valve system of FIG. 28 when the exhaust valves fail to move to an open position.

The wires 148 supplying power to the electric motor 130 extend from the electric motor 130, then between the gear box 134 and the inside of the cover 116, then through an aperture 150 (FIG. 13) in the cover 116 and connect to a connector 152. The connector 152 is connected to a controller 262 (FIG. 29). A grommet 154 is disposed around the portion of the wires 148 extending through the aperture 150.

With reference to FIG. 17, the electric motor 130 has an output shaft 156 rotationally supported in a motor housing 158. A rotor and a stator (not shown) are provided inside the motor housing 158. The rotor is connected to the output shaft 156. As can be seen, the output shaft 156 of the electric motor 130 and the lead screw 132 are parallel to each other.

The gear box 134 includes an input gear 160, a double gear 162 mounted on a shaft 164, and an output gear 166. The double gear 162 includes a major gear 168 and a minor gear 170 that are concentric and integral. The input gear 160 is mounted to and driven by the end of the output shaft 156 of the electric motor 130 that extends inside the gear box 134. The input gear 160 engages the major gear 168 to drive the double gear 162. The minor gear 170 of the double gear 162 drives the output gear 166. The output gear 166 is mounted to and drives an end of the lead screw 132 that extends inside the gear box 134.

As can be seen in FIG. 17, the lead screw 132 is rotationally supported in the gear box 134 by a bearing 172. The lead screw 132 engages a plunger 174 having internal threads. The lead screw 132 and the plunger 174 partially extend inside a lead screw housing 176. The plunger 174 abuts the walls of the lead screw housing 176, which prevents the plunger 174 from rotating about a rotation axis of the lead screw 132. When the electric motor 130 drives the lead screw 132 via the gear box 134, the plunger 174 moves linearly along the lead screw 132. The direction of movement of the plunger 174 depends on the direction of rotation of the lead screw 132. The threads of the lead screw 132 are designed such that the lead screw 132 is self locking, meaning that when the electric motor 130 stops, the plunger 174 cannot move along the lead screw 132 as a result of forces pushing or pulling on the plunger 174. A magnet 264 is mounted to the side of the plunger 174 and moves along the lead screw 132 with the plunger 174. A valve position sensor 266 is mounted to the motor housing 158 for determining a position of the exhaust valves 106. The valve position sensor 266 senses a position of the magnet 264 and communicates this position to the controller 262. As there is a directed relationship between the position of the plunger 174 (and therefore the magnet 264) and the position of the exhaust valves 106, the signal from the valve position sensor 266 is indicative of the position of the exhaust valves 106 and can be used to determine the position of the exhaust valves 106. It is contemplated that other types of valve position sensors could be used. For example, a valve position sensor could sense the position of one of the exhaust valves 106 directly.

The plunger 174 defines a slot 178 (FIG. 17). As can be seen in FIG. 14, the head of a coupler 180 is received in the slot 178 such that the coupler 180 moves linearly with the plunger 174. The coupler 180 has external threads that thread into an aperture of a tie bar 182. The tie bar 182 is disposed in the volume defined by the housing 102. The tie bar 182 is disposed between the electric actuator 104 and the base plate 118. Two of the bolts 126 extend through apertures in the tie bar 182.

The tie bar 182 operatively connects the exhaust valves 106 to the electric actuator 104. More specifically, as can be seen in FIG. 14, the shafts 108 of the exhaust valves 106 extend through the base plate 118 inside the volume defined by the housing 102, and the ends of the shafts 108 connect to the tie bar 182. For each exhaust valve 106, the housing 102 includes a seal 184 disposed between the shaft 108 of the exhaust valve 106 and the base plate 118 to prevent exhaust gases from entering the housing 102. For each exhaust valve 106, a vibration absorbing mount 186 connects the shaft 108 of the exhaust valve 106 to the tie bar 182. The vibration absorbing mounts 186 reduce the transmission of vibrations from the exhaust valves 106 to the electric actuator 104. It is also contemplated that a vibration absorbing mount could be provided between the coupler 180 and the tie bar 182 and/or between the coupler 180 and the plunger 174.

When the electric motor 130 turns in one direction, the lead screw 132 moves the plunger 174 toward the base plate 118. As a result, the tie bar 182 moves toward the base plate 118, which moves the exhaust valves 106 simultaneously such that the blades 110 of the exhaust valves 106 move linearly away from the base plate 118 up to the actuated position of the exhaust valves 106 shown in FIG. 15. When the electric motor 130 turns in the other direction, the lead screw 132 moves the plunger 174 away from the base plate 118. As a result, the tie bar 182 moves away from the base plate 118, which moves the exhaust valves 106 simultaneously such that the blades 110 of the exhaust valves 106 move linearly toward the base plate 118 up to the retracted position of the exhaust valves 106 shown in FIG. 14.

The exhaust valve assembly 100 also have three pairs of exhaust valve passage fillers 188, one per exhaust valve 106, connected to the base plate 118. In the present embodiment, the exhaust valve passage fillers 188 are integral with the base plate 118, but it is contemplated that they could be connected in other ways. As can be seen in FIGS. 14 and 15, for each exhaust valve 106, the shaft 108 of the exhaust valve 106 extends between its two corresponding exhaust valve passage fillers 188, and the corresponding exhaust valve passage fillers 188 are disposed between the base plate 118 and the blade 110 of the exhaust valve 106. As can be seen in FIG. 14, when the exhaust valves 106 are in their retracted positions, the exhaust valve passage fillers 188 generally follow a contour of their corresponding exhaust valves 106. As their name suggests, the exhaust valve passage fillers 188 fill portions of the exhaust valve passages 42. More specifically, the exhaust valve passage fillers 188 fill the portions of the exhaust valve passages 42 located between the blades 110 of the exhaust valves 106 and the base plate 118 as can be seen in FIG. 2. The exhaust valve passage fillers 188 help reduce potential carbon build up in the exhaust valve passages 42 between the blades 110 of the exhaust valves 106 and the base plate 118.

Figure 21:
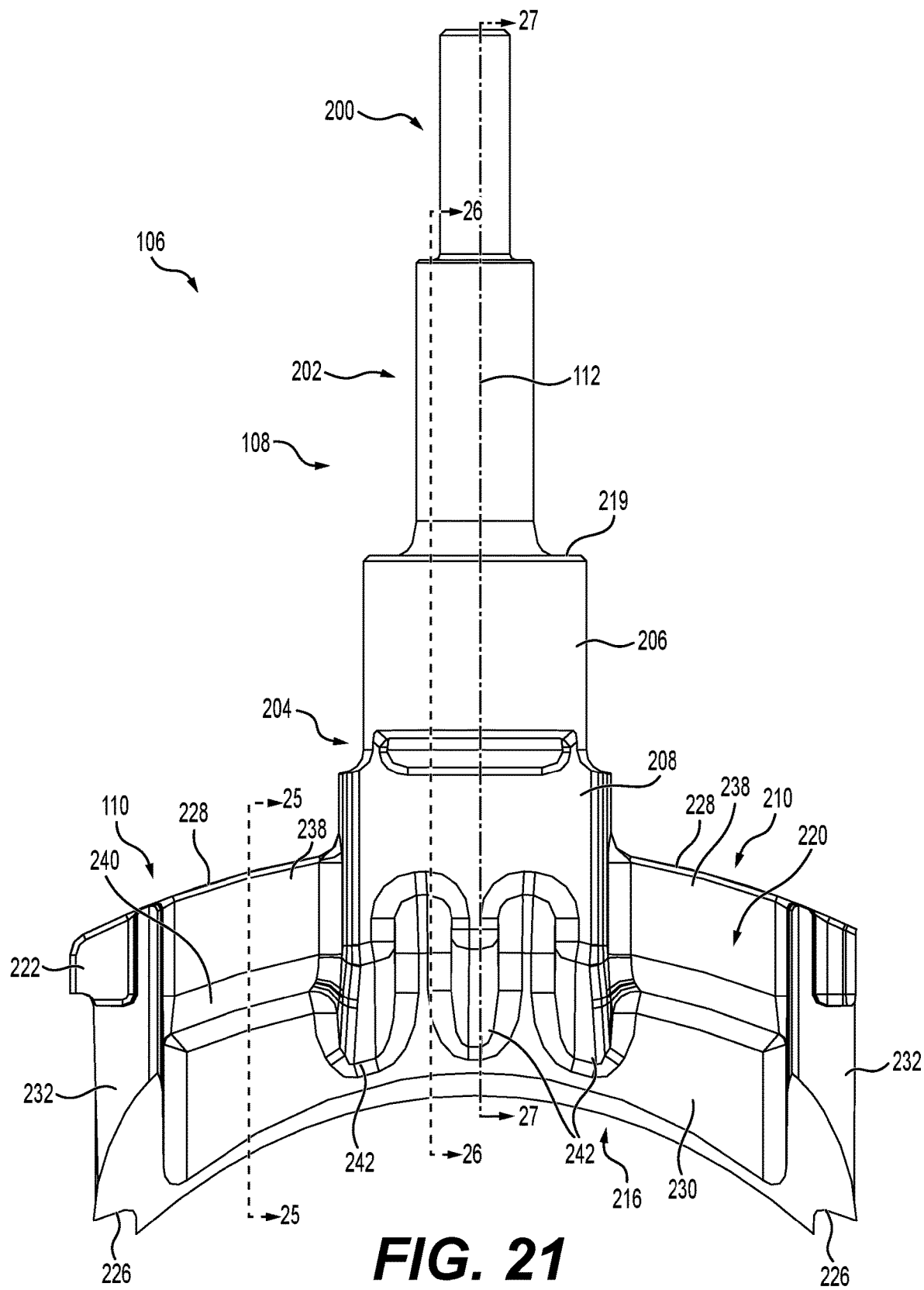
FIG. 21 is a rear elevation view of the exhaust valve of FIG. 18.
Figure 22:
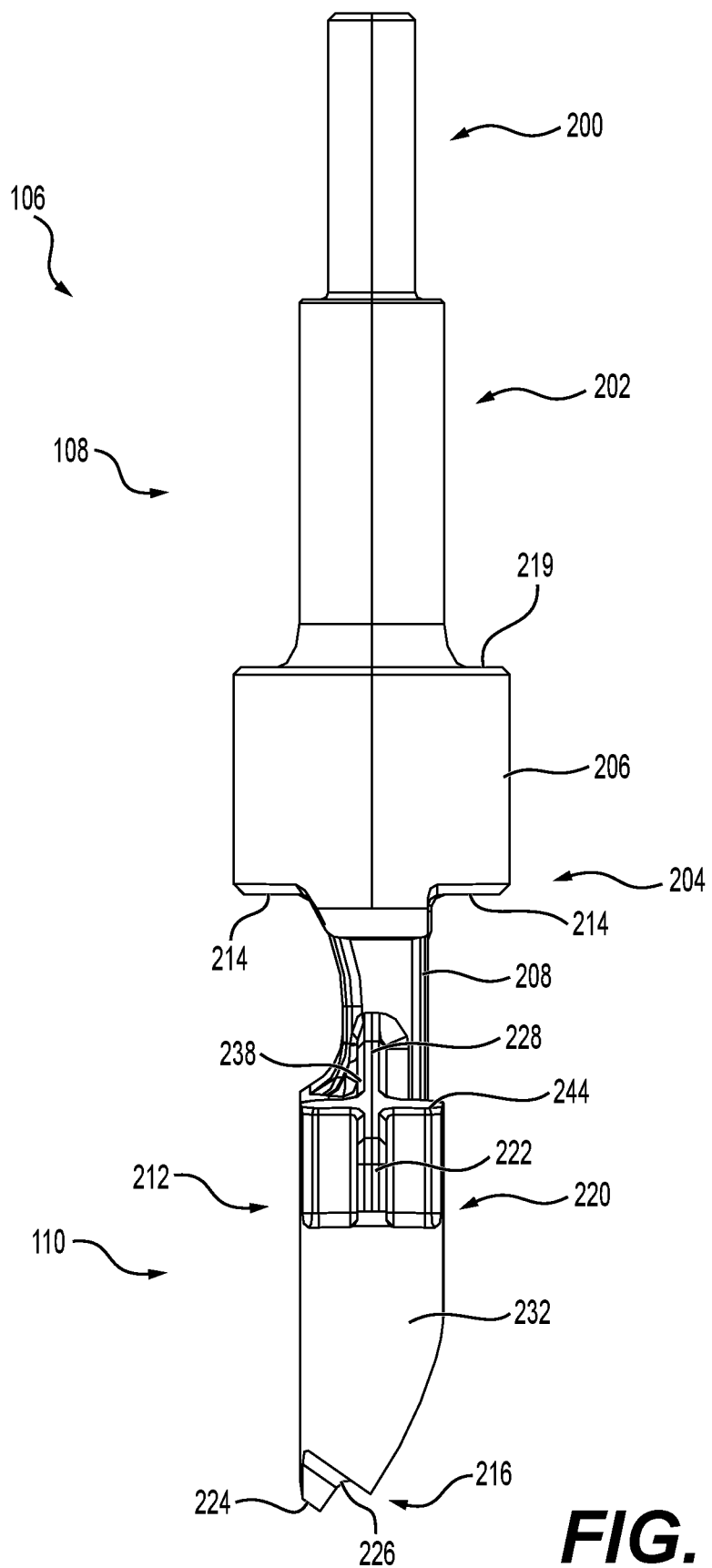
FIG. 22 is a left side elevation view of the exhaust valve of FIG. 18.

Turning now to FIGS. 18 to 27, additional details of the exhaust valves 106 will be described. As all three exhaust valves 106 are identical, these details will be described with respect to only one exhaust valve 106. Also, for simplicity, the exhaust valve 106 will be described with respect to a frame of reference of the exhaust valve 106, not the frame of reference of the engine 10. In the frame of reference of the exhaust valve 106, the side of the exhaust valve 106 shown in FIG. 21 is a rear of the exhaust valve 106 and, in FIG. 21, the right side of the exhaust valve 106 is on the right and the left side of the exhaust valve 106 is on the left. Also, in the frame of reference of the exhaust valve 106, the top of the exhaust valve 106 corresponds to the free end of shaft 108, the bottom of the exhaust valve 106 corresponds to the free end of the blade 110, and the reciprocation axis 112 extends vertically. In the frame of reference of the engine 10, the reciprocation axis 112 extends horizontally. In the frame of reference of the exhaust valve 106, the reciprocation axis 112 defines a longitudinal direction, and the lateral direction is perpendicular to the longitudinal direction in the plane defined by the page of FIG. 19. Height is measured in the longitudinal direction. Width is measure in the lateral direction. Thickness is measured in a direction perpendicular to the longitudinal and lateral directions (i.e. in a direction normal to the plane defined by the page of FIG. 19).

In the present embodiment, the shaft 108 and the blade 110 of the exhaust valve 106 are integral and are made of a relatively low thermal conductivity material. One example of such a material is stainless steel. Other materials are contemplated.

Figure 19:
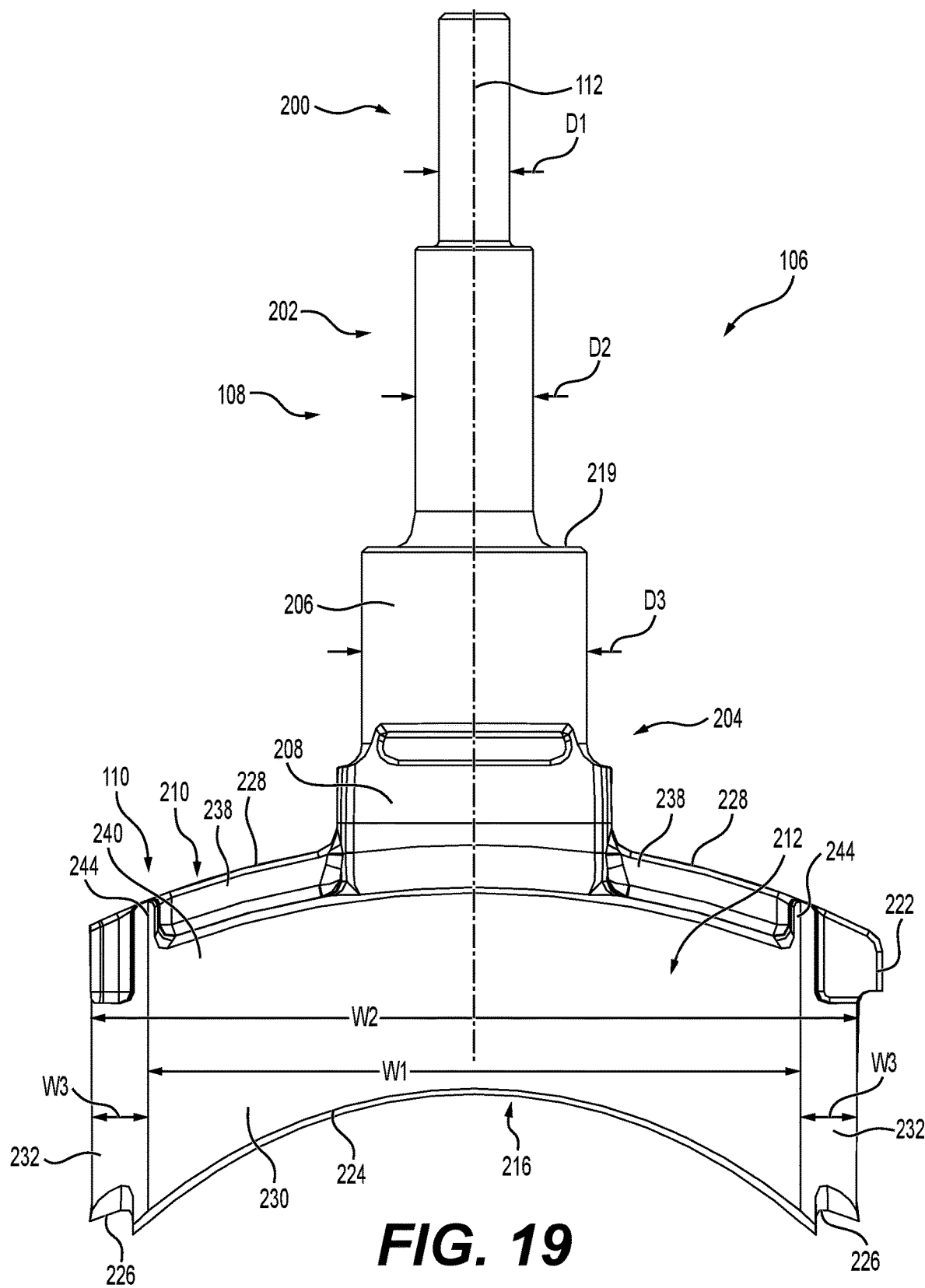
FIG. 19 is a front elevation view of the exhaust valve of FIG. 18.
Figure 20:
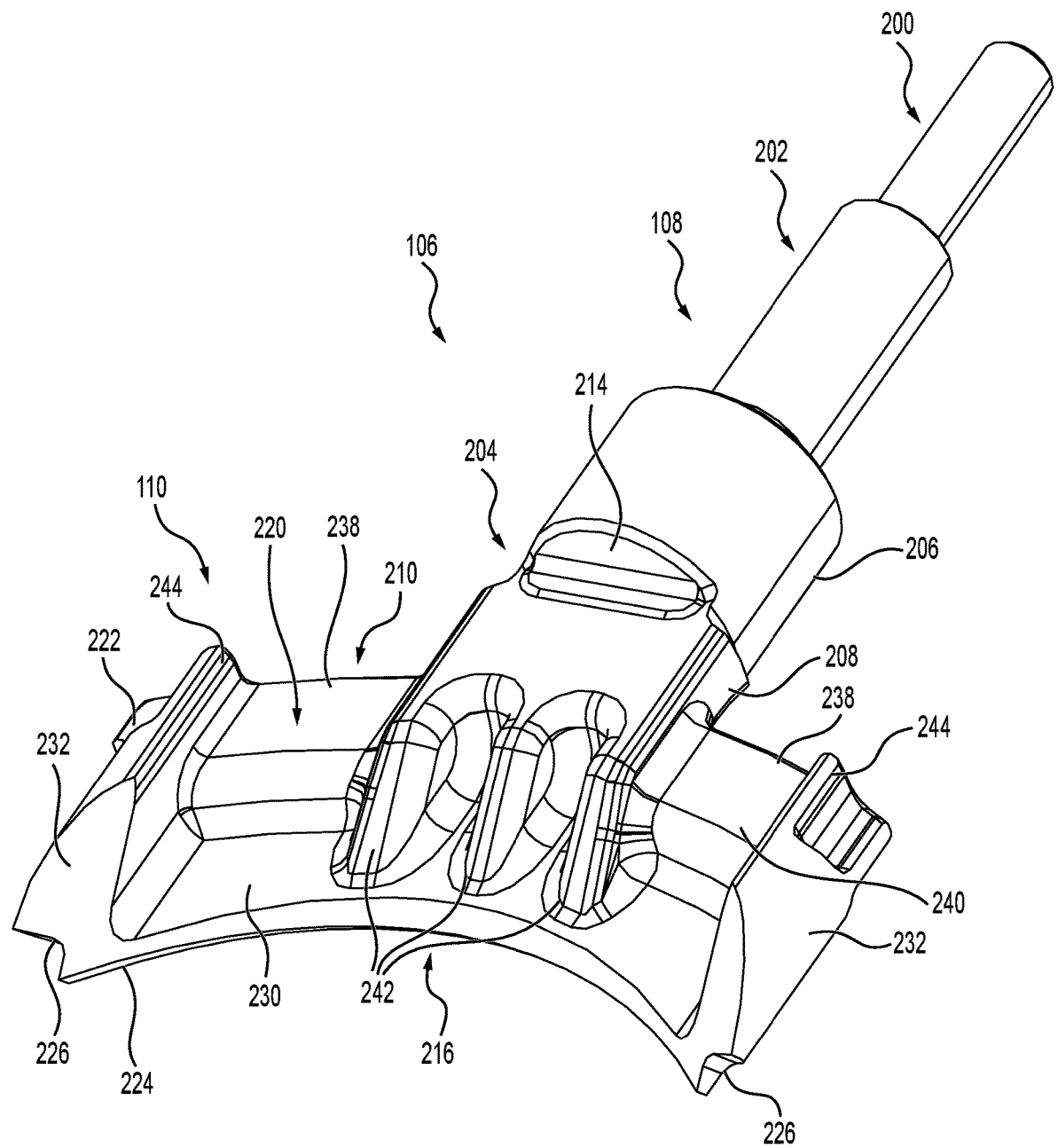
FIG. 20 is a perspective view taken from a rear, right side of the exhaust valve of FIG. 18.

The shaft 108 has an upper portion 200, a middle portion 202 and a lower portion 204. With reference to FIG. 19, the upper portion 200 is cylindrical and has a diameter D1. The upper portion 200 is the portion of the shaft 108 that is received in the vibration absorbing mount 186 to connect the shaft 108 to the tie bar 182. The middle portion 202 is cylindrical and has a diameter D2 that is larger than the diameter D1. The middle portion 202 is the portion of the shaft 108 that passes through the base plate 118 and the seal 184. The lower portion 204 defines a stopper 206 and a neck 208. The stopper 206 has a diameter D3 that is larger than the diameters D1 and D2. The neck 208 has a generally rectangular cross-section. The neck 208 disposed between the stopper 206 and the upper end 210 of the blade 110. The neck 208 connects the shaft 108 to the upper end 210 of the blade 110.

Figure 25:
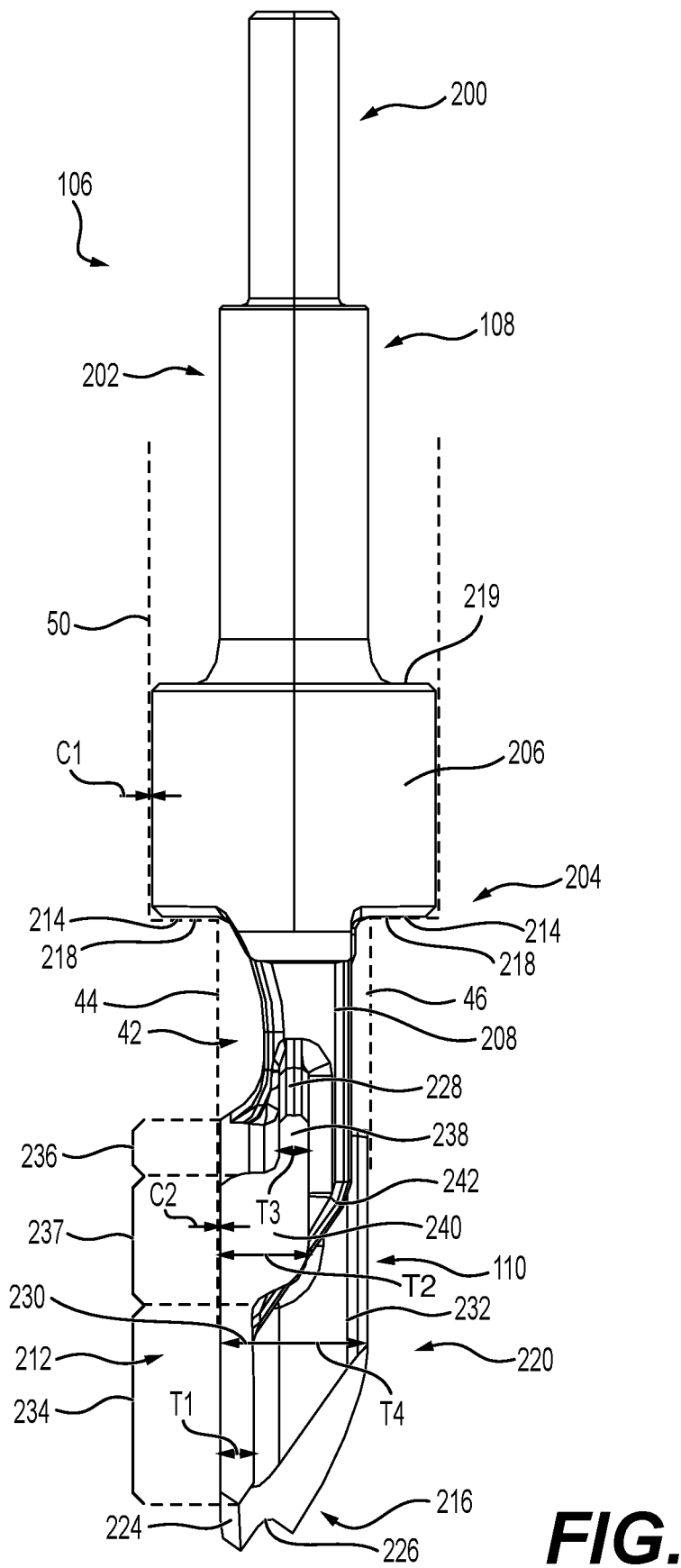
FIG. 25 is a cross-sectional view of the exhaust valve of FIG. 18 taken through line 25-25 of FIG. 21 with walls of the exhaust valve passage shown in dotted lines.
Figure 26:
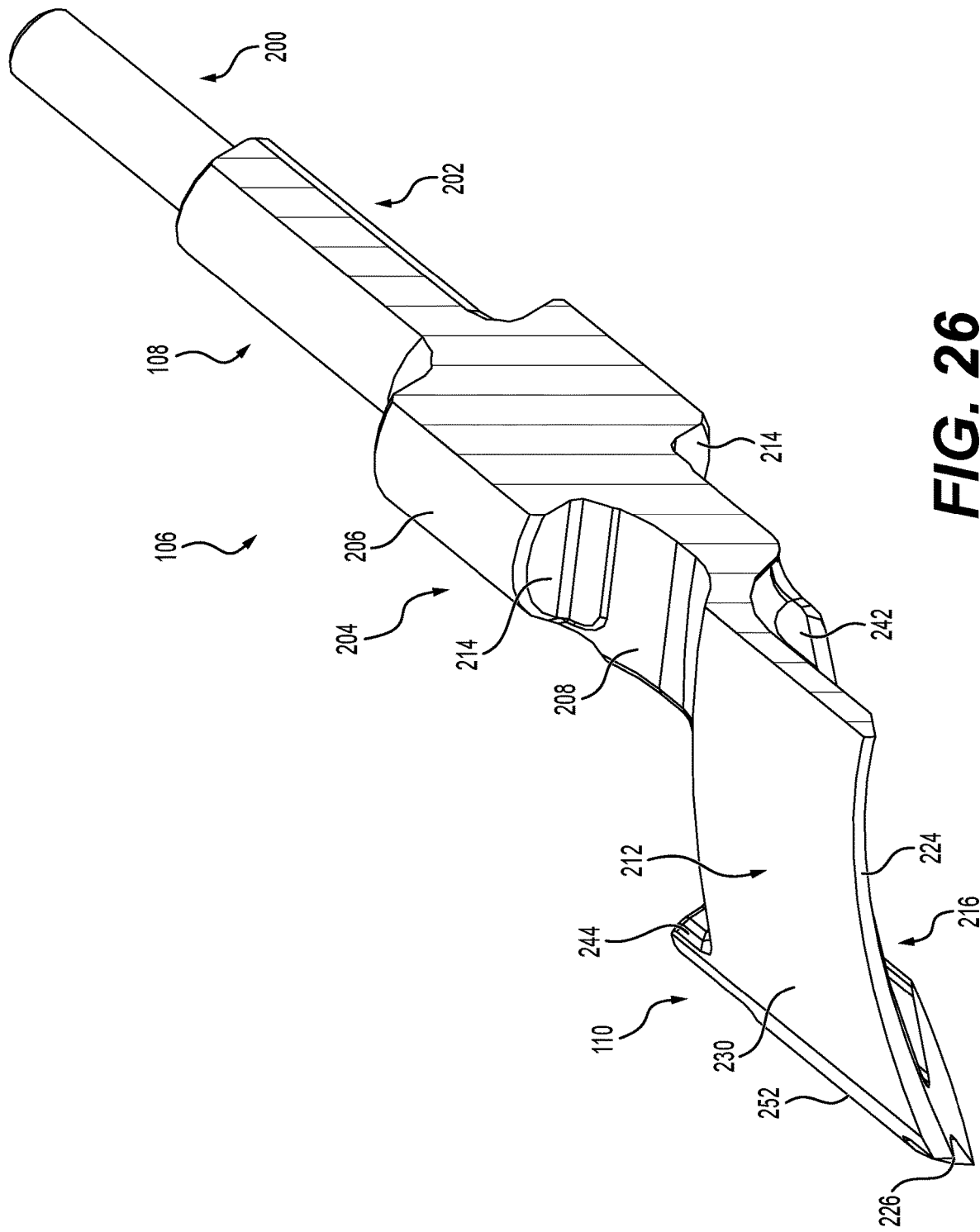
FIG. 26 is a cross-sectional view of the exhaust valve of FIG. 18 taken through line 26-26 of FIG. 21.
Figure 27:
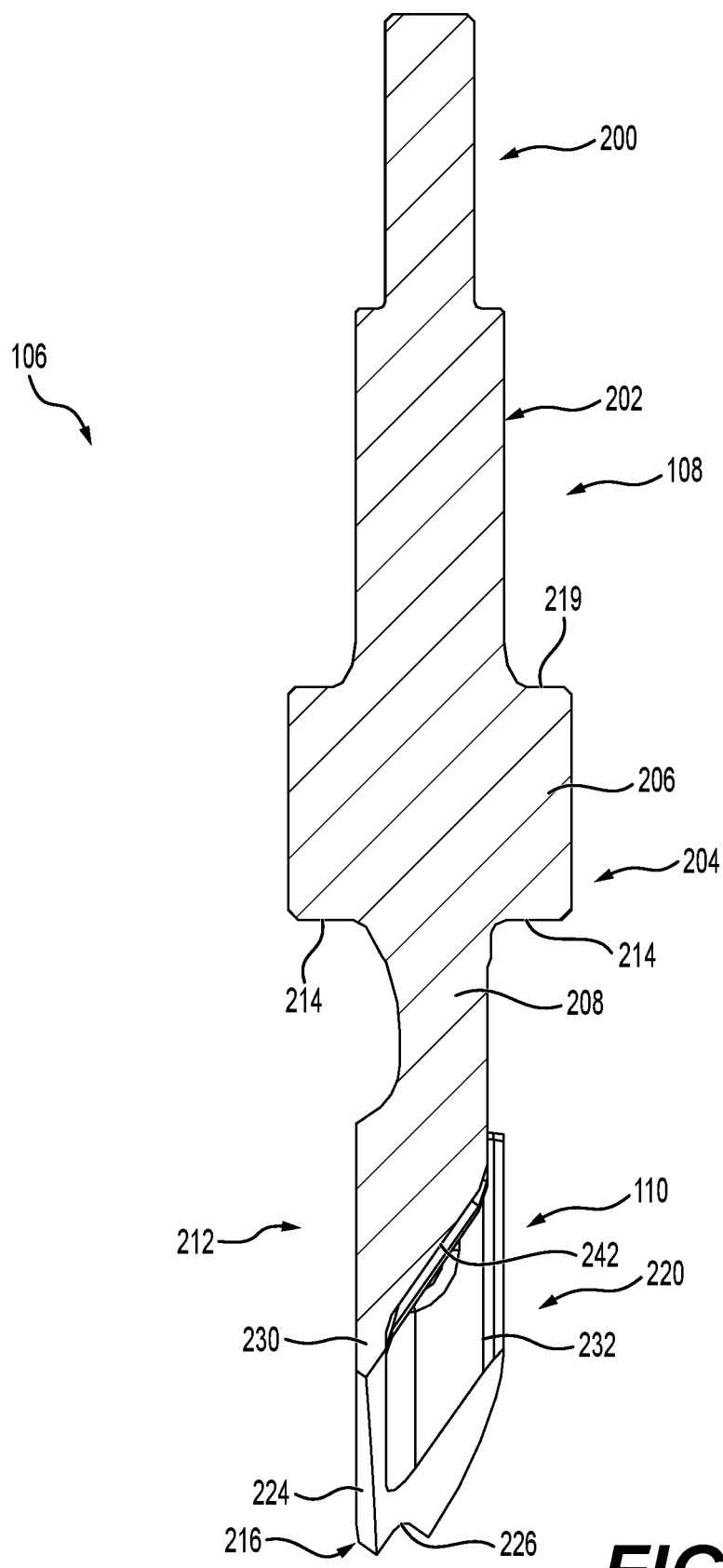
FIG. 27 is a cross-sectional view of the exhaust valve of FIG. 18 taken through line 27-27 of FIG. 21.

As seen in FIG. 25, the stopper 206 is received in the cylindrical portion 50 of the exhaust valve passage 42. The diameter D3 is sized so as to be in sliding fit with the cylindrical portion 50 of the exhaust valve passage 42. In one embodiment, a clearance C1 between the stopper 206 and the walls of the cylinder block 20 defining the cylindrical portion 50 of the exhaust valve passage 42 has a nominal value of 0.1 mm. As best seen in FIG. 7, this clearance C1 is less than a minimum clearance between the blade 110 and the walls of the cylinder block 20 defining the exhaust valve passage 42. This minimum clearance is a clearance C2 between a front face 212 of the blade 110 and the wall 44 of the exhaust valve passage 42. In one embodiment, the clearance C2 has a nominal value of 0.28 mm which is almost three times as large as the clearance C1 of 0.1 mm. The sliding fit between the stopper 206 and the walls of the cylinder block 20 defining the cylindrical portion 50 allow the stopper 206 to accurately guide the blade 110 as the exhaust valve 106 is reciprocated along the reciprocation axis 112 by the electric actuator 104.

The stopper 206 has stopper surfaces 214 facing toward the lower end 216 of the blade 110. As can be seen in FIG. 25, the exhaust valve passage 42 defines step 218. In order to prevent the blade of the exhaust valve 106 from extending too far into the exhaust passage 40 when it is moved to the actuated position and in order to support the exhaust valve 106 when in the actuated position, the stopper surfaces 214 abut the steps 218. The stopper 206 also has a stopper surface 219 facing toward the upper end of the shaft 108. In order to prevent the blade 110 of the exhaust valve 106 to extend too far out of the exhaust passage 40 when it is moved to the retracted position, the stopper surface 219 abuts the exhaust valve passage fillers 188 as can be seen in FIG. 14.

As described above, the blade 110 of the exhaust valve 106 has an upper end 210, a lower end 216 and a front face 212. The exhaust valve 106 also has a rear face 220. The faces 212, 220 extend between the ends 210, 216. When the exhaust valve 106 is disposed in the exhaust valve passage 42, the front face 212 faces the wall 44 and the rear face 220 faces the wall 46 as can be seen in FIG. 25. In order to ensure that the exhaust valve 106 is inserted in the exhaust valve passage 42 in this orientation, the blade 110 has a poka yoke in the form of a protrusion 222 extending from its left side. The exhaust valve passage 42 has a corresponding slot (not shown) on only one of its side, thus ensuring that the blade 110 can only be inserted in one orientation.

As can be seen, a majority of the front face 212 is flat. The rear face 220 has various features that will be described in more detail below. The lower end 216 of the blade 110 has an arcuate edge 224 extending along a majority of its width. The lower end 216 also defines two notches 226 at its lateral ends. The arcuate edge 224 is angled so that it is generally parallel to the cylinder axis 30 when the exhaust valve 106 is in the exhaust valve passage 42. The radius of curvature of the arcuate edge 224 is selected so that the arcuate edge 224 closely follows the curvature of the cylinder liner 36 when the exhaust valve 106 is in the actuated position. The notches 226 ensure the arcuate edge 224 can be moved into the exhaust port 34 when the exhaust valve 106 is in the actuated position without having the blade 110 contact the cylinder liner 36. As can be seen in FIG. 19, the upper end 210 of the blade 110 has two arcuate edges 228 and the shaft 108 is connected between the two arcuate edges 228. The radius of curvature of the arcuate edges 228 is greater than the radius of curvature of the arcuate edge 224.

The blade 110 has a central portion 230 disposed laterally between two side portions 232. As would be understood from FIG. 22, a cross-section of each of the side portions 232 taken through a plane extending in the lateral direction and being normal to the reciprocation axis 112 is semi-circular. With reference to FIG. 19, it can be seen that a width W1 of the central portion 230 is greater than half of a width W2 of the blade 110. It can also be seen that the width W1 of the central portion 230 is greater that a width W3 of each side portion 232, and greater than a sum of the widths W3 of the side portions 232.

With reference to the cross-section of FIG. 25, the blade 110 has a lower portion 234 adjacent its lower end 216, an upper portion 236 adjacent its upper end 210, and a mid-portion 237 longitudinally between the lower and upper portions 234, 236. These portions 234, 236, 237 are generally arcuate (i.e. following the upper and/or lower curvatures of the blade 110) and extend the width of the blade 110. The portions of the central portion 230 located in the upper portion 236 adjacent to the arcuate edges 228 are referred to herein as sub-portions 238. The portion of the central portion 230 located in the mid-portion 237 is referred to herein as the central mid-portion 240.

As can be seen in FIG. 25, the part of the central portion 230 in the lower portion 234 has a thickness T1, the central mid-portion 240 has a thickness T2, the sub-portions 238 have a thickness T3, and the side portions 232 have a thickness T4. It can be seen that the thickness T2 is greater than the thickness T1 and greater than the thickness T3. The thickness T1 is slightly greater than the thickness T3. The thickness T4 is greater than the thickness T1. By comparing FIGS. 25 and 27, it can also be seen that the portion of the central portion 230 disposed laterally between the two sub-portions 238 has a thickness T5 which is greater than the thickness T3 of the sub-portions 238.

The thin portions of the blade 110 (i.e. portions having thicknesses T1 and T3), under certain operating conditions of the engine 10, are more likely to heat up above the carbon burn-off temperature thereby burning off these components than the blades of other existing exhaust valves. Other geometric characteristics of the blade 110 also contribute to the heating of the blade 110.

The thicker portions of the blade 110 (i.e. portions having thicknesses T2, T4 and T5) contributed to the rigidity of the blade 110. To further enhance its rigidity, the blade 110 is provided with a reinforcing structure having three ribs 242 on its rear face 220. It is contemplated that there could be more or less than three ribs 242 or that the reinforcing structure could taken another form. The ribs 242 are disposed laterally between the sub-portions 238 and are aligned with the shaft 108. To rigidify the sub-portions 238, each side portion 232 defines a flange 244 adjacent to the upper end 210. The flanges 244 are connected to and extend perpendicular to their respective sub-portions 238.

Figure 23:
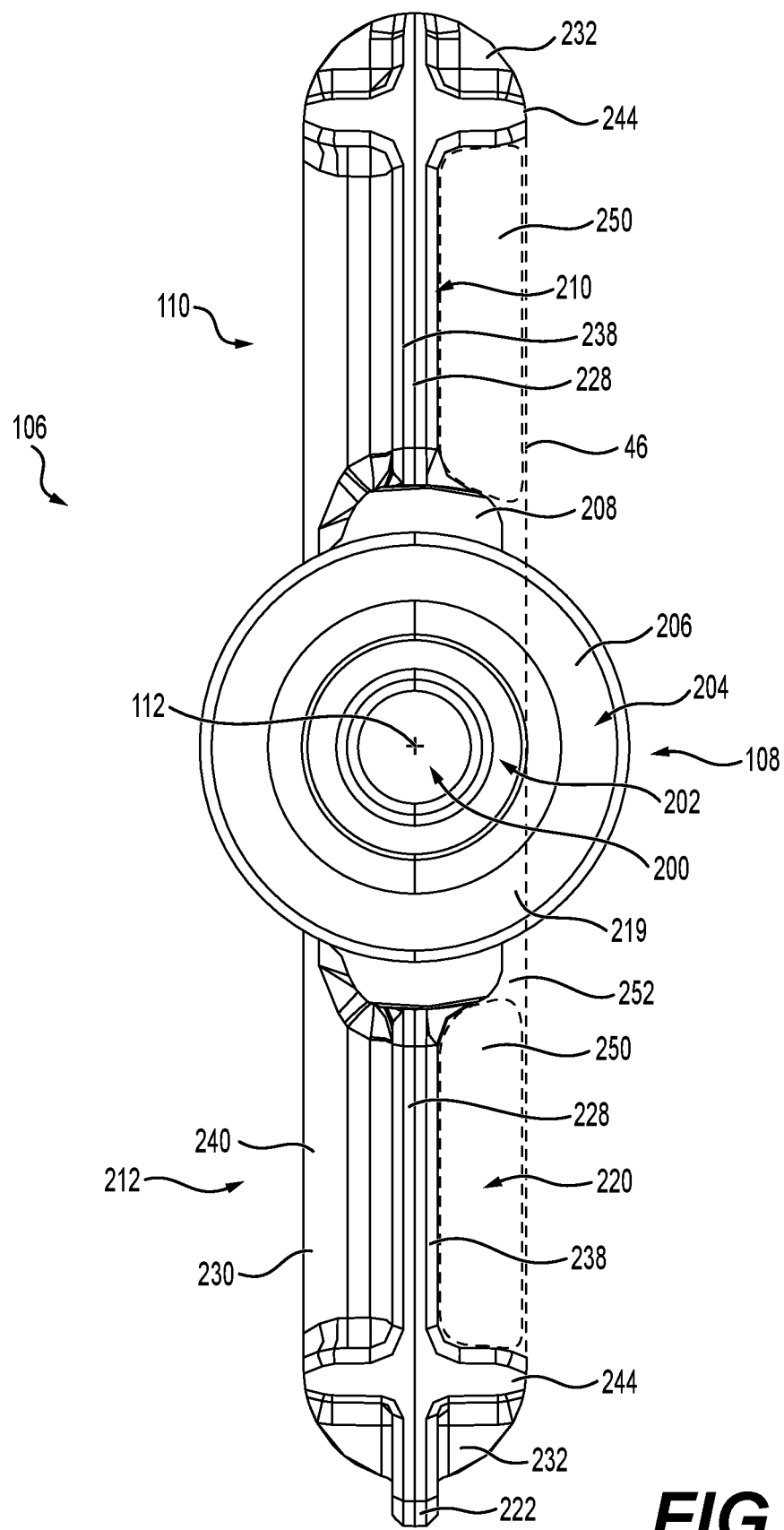
FIG. 23 is a top plan view of the exhaust valve of FIG. 18.
Figure 24:
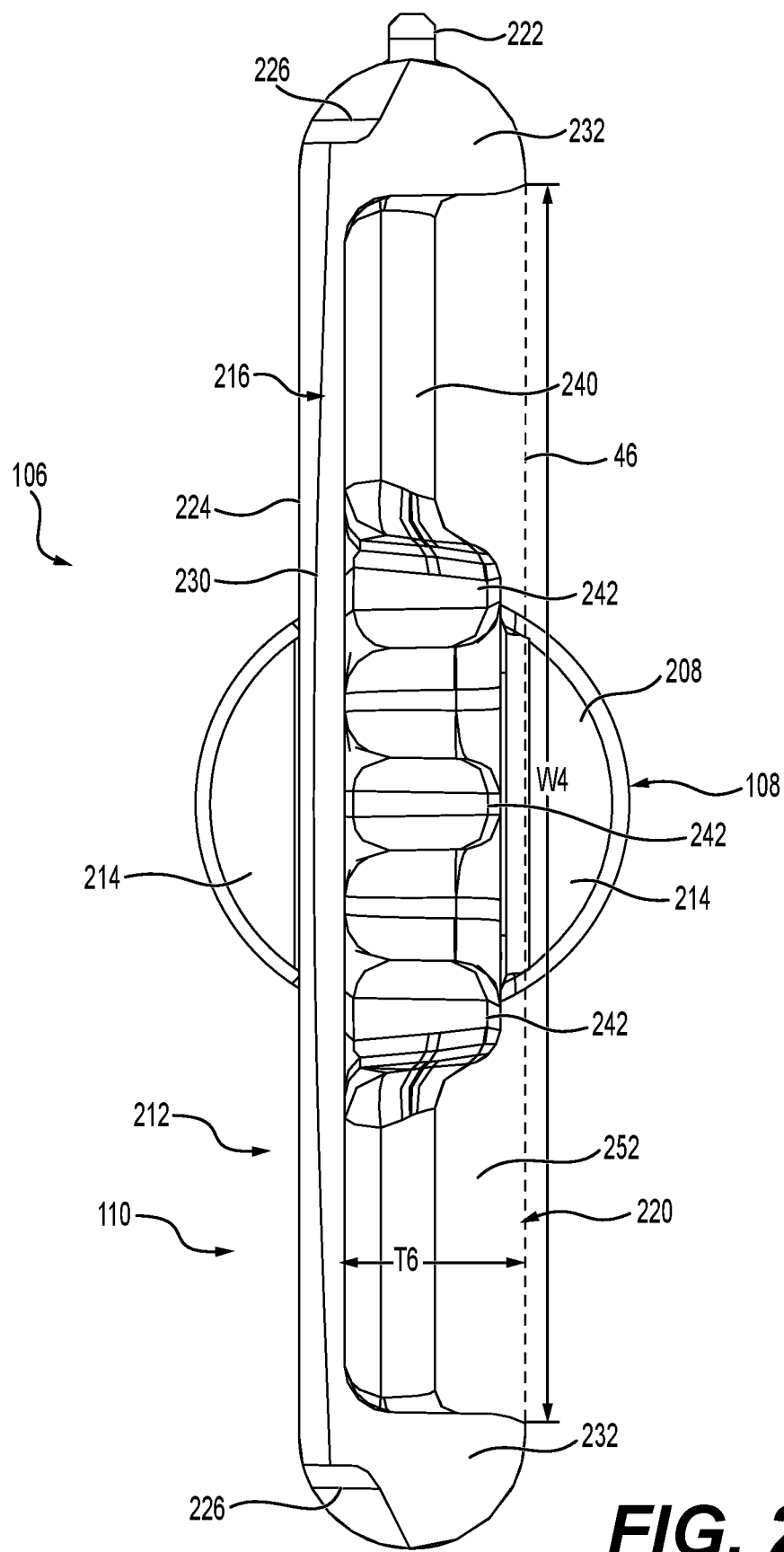
FIG. 24 is a bottom plan view of the exhaust valve of FIG. 18.

With reference to FIGS. 23 and 24, the blade 110 defines two channels 250 along its rear face 220 that extend longitudinally. The channels 250 are on opposite sides of the reciprocation axis 112 and are adjacent to their corresponding side portions 232. Each channel 250 is defined on one side by its corresponding side portion 232 and on the other side by the reinforcing structure having the ribs 242.

The channels 250 and the wall 46 define a valve passage 252 that fluidly communicates with the exhaust passage 40. The valve passage 252 extends the width of the central portion 230 in the lower portion 234 of the blade 110. As such the passage 252 has a width W4 (FIG. 24) that is greater than half of the width W2 of the blade 110. In other embodiments, the width W4 of the passage 252 is greater than at least a third of the width W2 of the blade 110. A maximum thickness T6 (FIG. 24) of the passage 252 is at least one third of the diameter D3 of the stopper 206.

The passage 252 permits the flow of exhaust gases along the rear face 220 between the ends 210, 216 of the blade 110 and into and out of the space of the exhaust valve passage 42 between the upper end 210 of the blade 110 and the exhaust valve passage fillers 188. Due to its relatively large size, a substantial flow of exhaust gases along the rear face 220 of the blade 110 is permitted which permits the exhaust gases, under certain operating conditions of the engine 10, to heat the blade 110 above the carbon burn-off temperature of exhaust components that may have accumulated on the blade 110. Also, the size of the passage 252 does not promote the compaction of the exhaust gas components between the blade 110 and the wall 46 of the exhaust valve passage 42 and permits these components to fall into the exhaust passage 40 as the exhaust valve 106 reciprocates. Finally, when the relatively thin upper portion 236 of the blade 110 moves to the retracted position, it can make contact with any exhaust components that may have built up on the ends of the exhaust valve passage fillers 188, thus breaking up these components which then fall through the passage 252 into the exhaust passage 40.

Figure 28:
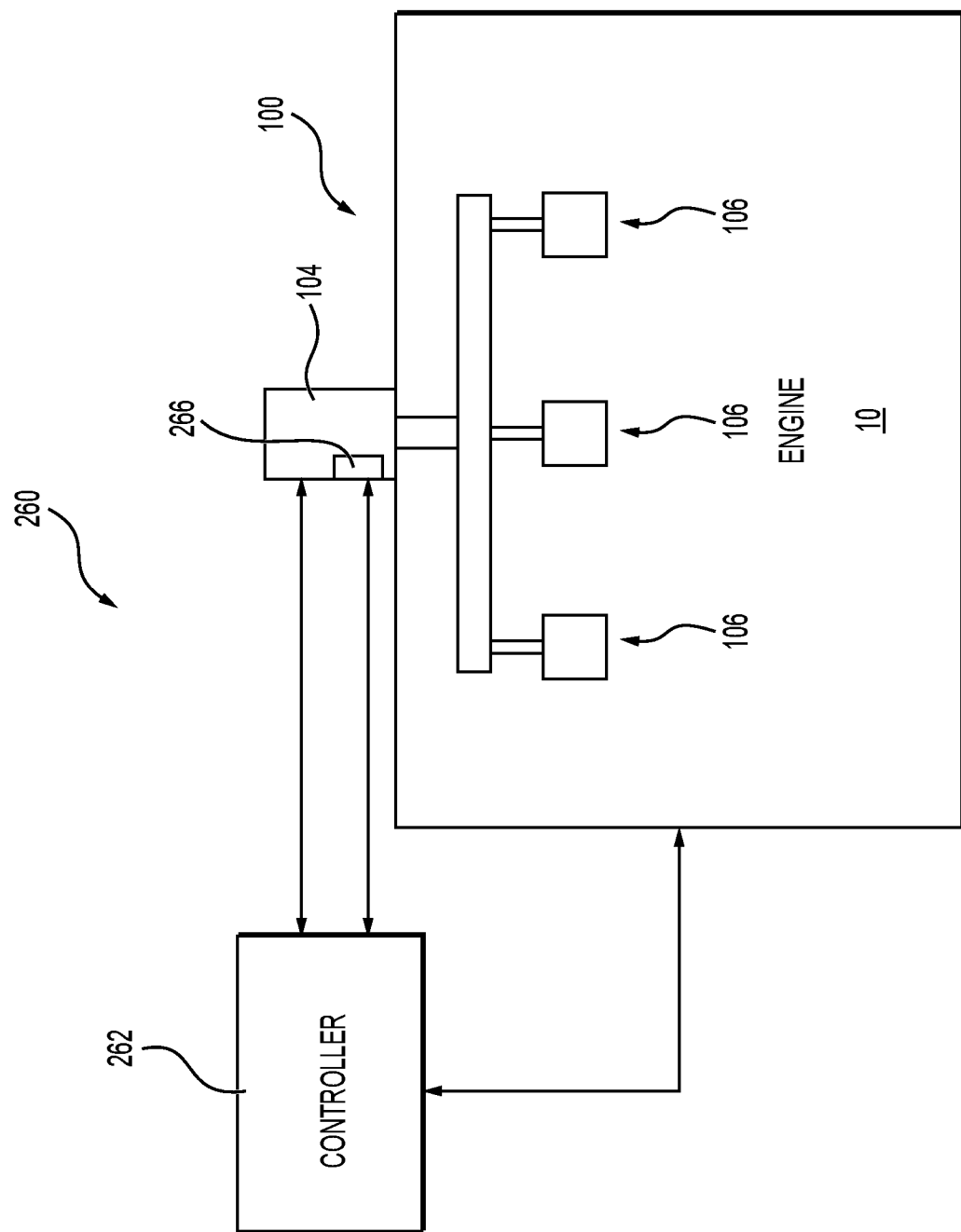
FIG. 28 is a schematic illustration of an exhaust valve system of the engine of FIG. 1A.

Turning now to FIG. 28, the controller 262, together with the actuator 104, the exhaust valves 106, the valve position sensor 266 and other components of the exhaust valve assembly 100 form an exhaust valve system 260. The controller 262 receives signals from various sensors. These include a throttle position sensor (not shown), the valve position sensor 266, and other sensors on the engine 10, such as an engine speed sensor (not shown). Additional sensors could also send signals to the controller 262. Based on these signals, the controller 262 communicates with the actuator 104 for controlling it. The actuator 104 then attempts to move the exhaust valves 106 to the desired position in response to the signals received from the controller 262. In the present embodiment, the controller 262 also sends signals to the engine 10 to control the fuel injection and ignition and to a throttle valve actuator (not shown) to control the air intake to the engine 10 in order to control engine operation. It is contemplated that in other embodiments, a separate controller communicating with the engine and the controller 262 could control the operation of the engine 10. It is contemplated that the functions of the controller 262 could be split between multiple control units.

Figure 30:
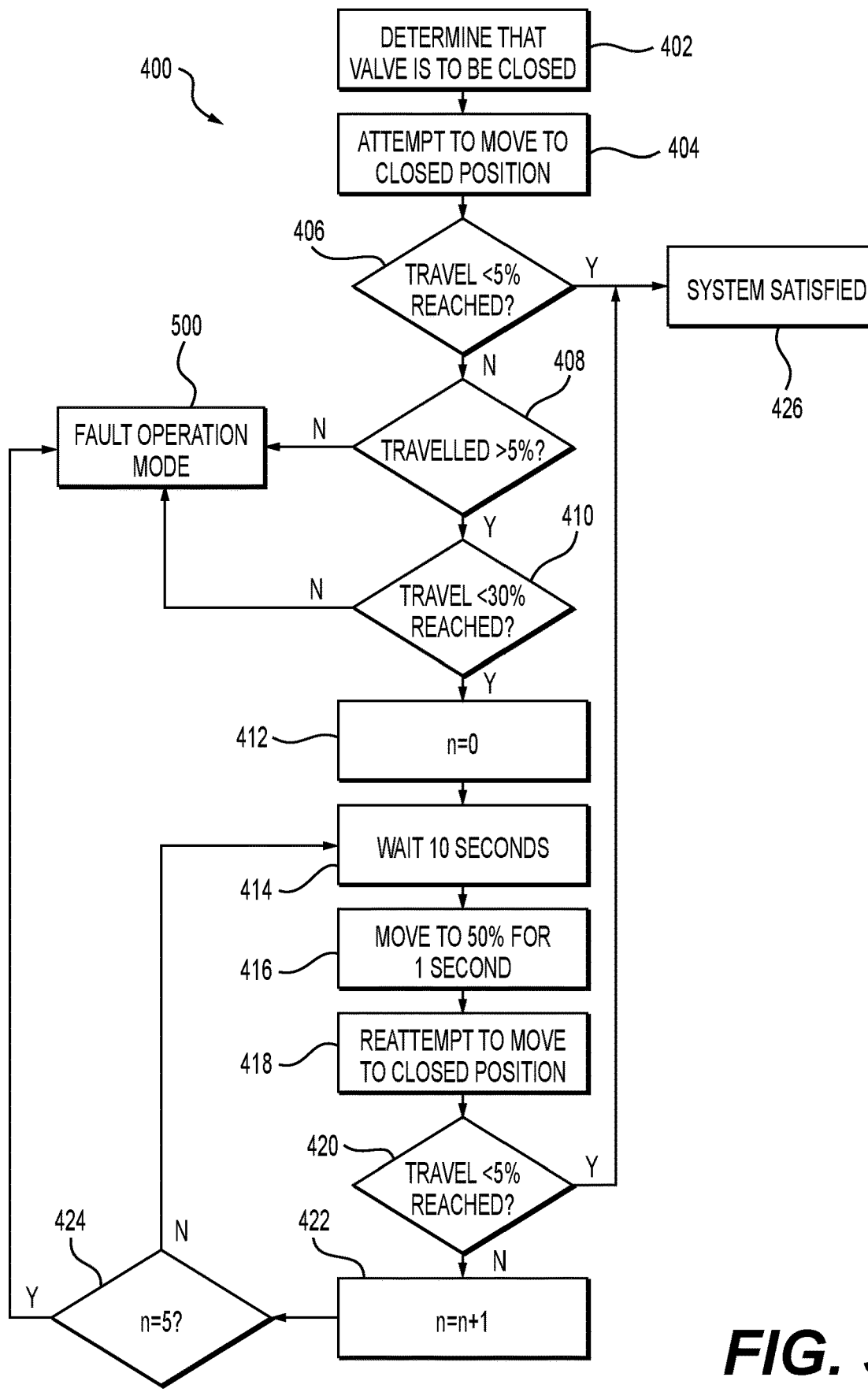
FIG. 30 is a logic diagram illustrating a method for cleaning the exhaust valves of the exhaust valve system of FIG. 28 when the exhaust valves fail to move to a closed position.
Figure 31:
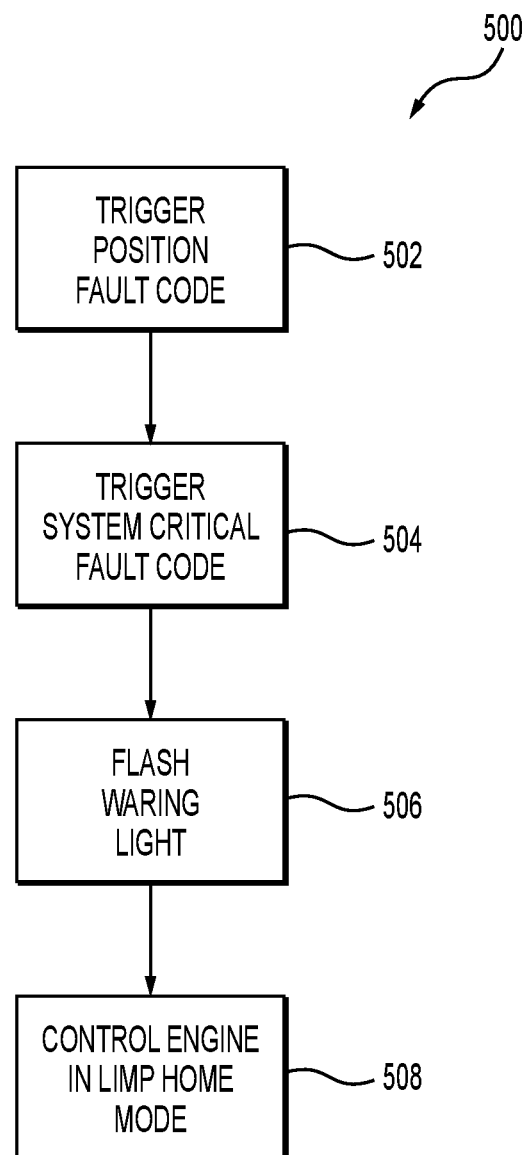
FIG. 31 is a logic diagram illustrating a fault operation mode of the methods of FIGS. 29 and 30.

Turning now to FIGS. 29 to 31, methods 300, 400 for cleaning the exhaust valves 106 of the exhaust valve system 260 described above will be described. It is contemplated that the methods 300, 400, or at least some aspects of these methods could be used with an exhaust valve system having a different type of exhaust valves and/or a different type of actuator. The controller 302 is programmed to carry out the steps of the methods 300 and 400. In the present embodiment, the actuator 104 moves all three exhaust valves 106 together. As such, if any one of the exhaust valves 106 cannot reach a desired one of an open or closed position because this exhaust valve 106 needs to be cleaned, then all three exhaust valves 106 will not reach this position and all three exhaust valves 106 will be cleaned according to the method 300 or 400. The term "cleaning" refers to the removal of exhaust components that have built up on the exhaust valves 106, and more specifically on the blade 110 of the exhaust valve 106. This build-up of exhaust components can get caught between the blade 110 of the exhaust valve 106 and the surrounding components, thus preventing the exhaust valves 106 to reach the open or closed positions. As all three exhaust valves 106 move together, the methods 300, 400 will be described with respect to a single exhaust valve 106. It should be understood that when referring to a condition of "the exhaust valve 106", this condition may only need to be met by one of the three exhaust valves 106. For example, when with reference to step 308 below it is described that "the exhaust valve 106 is stuck", it should be understood that only one of the exhaust valves 106 needs to be stuck for the described condition to be met because if one exhaust valve 106 is stuck, then the other two exhaust valves 106 are in the same position as this exhaust valve 106.

In the methods 300 and 400, the position of the exhaust valve 106 is described in terms of percentage, with 100% being the fully opened position (i.e. the position at which the exhaust valve 106 is most retracted inside the corresponding exhaust valve passage 42) and 0% being the fully closed position (i.e. the position at which the exhaust valve 106 is most extended inside the exhaust passage 40). In the present embodiment, the 0% and 100% positions are calibrated at the factory and the corresponding readings obtained from the valve position sensor 266 are stored in the controller 262. It is contemplated that the 0% and 100% positions could be re-calibrated after maintenance of the exhaust valve assembly 100 or replacement of parts of the exhaust valve assembly 100. In the present embodiment, the intermediate position referred to in the methods 300 and 400 is at 50% (i.e. halfway between the fully open and fully closed positions). It is contemplated that the intermediate position could be another position of the exhaust valve 106 where the blade 110 of the exhaust valve 106 is more exposed to the hot exhaust gases than in the retracted position. It is contemplated that the position of the exhaust valve 106 could be expressed differently. For example, the position could be expressed in terms of a distance from one of the open and closed positions. In another example, the fully open position could correspond to 0% and the fully closed position could correspond to 100%. In the present embodiment, the engine 10 normally operates with the exhaust valve 106 in either the closed or open positions, with the intermediate position used solely for cleaning the exhaust valve 106. It is contemplated that the engine 10 could operate normally in closed, open and one or more intermediate positions.

The method 300 is used when the exhaust valve 106 is in the closed position and the controller 262 determines that based on the throttle request from the user and the operating conditions of the engine 10 the exhaust valve 106 should be moved to the open position. The method 400 is used when the exhaust valve 106 is in the open position and the controller 262 determines that based on the throttle request form the user and the operating conditions of the engine 10 the exhaust valve should be moved to the closed position. The methods 300, 400 are used to attempt to clean the exhaust valve 106 in the event that the actuator 104 is unable to move the exhaust valve 106 to the desired one of the open and closed position in an attempt to permit the actuator 104 to eventually move the exhaust valve to the desired one of the open position and the closed position. The operating condition of then engine 10 is determined by the controller 262 based on the signals received from the various sensors that communicate with the controller 262, some of which have been described above.

Turning now to FIG. 29, the method 300 for cleaning the exhaust valve 106 will be described. At step 302, the controller 262 sets a counter X to zero. This step is only done once when the engine 10 is first started. The counter X will not be reset to zero until the engine 10 is turned off, then turned on again. From step 302, the controller 262 proceeds to step 304. As would be understood from the above, should the method 300 be carried out more than once after the engine 10 has started, the controller 262 will begin the method 300 at step 304.

At step 304, the controller 262 determines, based on the operating condition of the engine 10, if the exhaust valve 106 should be in the open position. If the desired position is the open position, then the controller 262 proceeds to step 306 to initiate the remainder of the method 300.

At step 306, the controller 262 sends a signal to the actuator 104 to move the exhaust valve 106 to the open position (100% position), in response to which the controller 104 attempts to move the exhaust valve 106 to this position. Then at step 308, based on the signal received from the valve position sensor 266, the controller 262 determines if the exhaust valve 106 has failed to reach the open position. To do this, the controller 262 compares the position sensed by the valve position sensor 266 to the desired valve position, which in this case is the 100% open position. Even if the 100% open position is not reached, if the exhaust valve 106 has reached a position that is greater than 92%, then the controller 262 determines that the exhaust valve 106 is sufficiently close to the desired open position. As a result, the system is satisfied (step 336), no exhaust valve cleaning is required, and the controller 262 will reinitiate method 300 the next time the exhaust valve 106 is to be moved from the closed position to the open position. It is contemplated that the percentage used at step 308 could be more or less than 92%. If at step 308 the controller 262 determines that the exhaust valve 106 has failed to reach the desired open position (i.e. the position of the exhaust valve 106 is not greater than 92%), then the controller 262 proceeds to step 310.

At step 310, the controller 262 determines if the exhaust valve 106 has moved by a distance that is more than 5%. To do this, the controller 262 compares the position of the exhaust valve 106 sensed by the valve position sensor 266 before the controller 262 sent the signal to the controller 104 at step 306 to the position of the exhaust valve 106 sensed by the valve position sensor 266 after the controller 104 has attempted to move the exhaust valve 106 to the open position at step 306. If the difference between these two positions is less than or equal to 5%, this indicates that the exhaust valve 106 is stuck. As a result, the controller 262 enters a fault operation mode 500 which will be described below. If at step 310 the controller 262 determines that the exhaust valve 106 is not stuck, then the controller proceeds to step 312. It is contemplated that the percentage used at step 310 could be more or less than 5%.

At step 312, based on the signal received from the valve position sensor 266, the controller 262 determines if the exhaust valve 106 has reached a position that is greater than 70%. If not, the controller 262 proceeds to step 338. Step 338 and the subsequent steps will be described in greater detail below. If the exhaust valve 106 has reached a position that is greater than 70% (but less than or equal to 92%), then the controller proceeds to step 314. It is contemplated that the percentage used at step 312 could be more or less than 70%.

At step 314, the controller 262 resets a counter n to zero. Then at step 316, the controller 262 sends a signal to the actuator 104 to move the exhaust valve 106 to the intermediate position (50% position), in response to which the controller 104 moves the exhaust valve 106 to this position. The actuator 104 maintains the exhaust valve 106 in the intermediate position for 30 seconds. During this time, the exhaust valve 106 is exposed to the hot exhaust gases and the blade 110 of the exhaust valve heats up, which can lead to exhaust components present on the blade 110 to burn off or break off the blade 110, without changing the port timing. It is contemplated that the amount of time at step 316 could be more or less than 30 seconds. After 30 seconds, the controller 262 proceeds to step 318. At step 318, the controller 262 sends a signal to the actuator 104 to move the exhaust valve 106 to the open position (100% position), in response to which the controller 104 reattempts to move the exhaust valve 106 to this position. Then the controller 262 proceeds to step 320. As step 320, the controller 262 determines if the exhaust valve 106 has failed again to reach the open position in the same way in which this was determined at step 308. If at step 320 the controller 262 determines that the exhaust valve 262 has reached the open position, then exhaust valve 106 is considered to have been successfully cleaned and the controller 262 proceeds to step 336 described above. If at step 320 the controller 262 determines that the exhaust valve 262 has failed to reach the open position again, then the controller 262 proceeds to step 322.

At step 322, the controller 262 increases the counter n by 1, and then at step 324 determines if the counter n has reached 5. It is contemplated that the value of the counter n at step 324 could be more or less than 5. If the counter n has not reached 5 at step 324, then the controller 262 returns to step 316 and the following steps are repeated. The cycles of heating and moving of the exhaust valve 106 should clean at least some of the exhaust components that have accumulated on the blade 110 of the exhaust valve 106. Also, when the actuator 104 reattempts to move the exhaust valve 106 to the open position, the relatively thin upper portion 236 of the blade 110 can contact any exhaust components that may have built up on the ends of the exhaust valve passage fillers 188, thus breaking up these components which then fall through the passage 252 into the exhaust passage 40. If at step 324 the counter n has reached 5, then the controller 262 proceeds to step 326.

At step 326, the controller 262 makes the same verification as in step 312. This is done in case the exhaust valve 106 now moves to a position that is less than or equal to 70% due to exhaust components that may have broken off from the blade 110 of the exhaust valve 106 during steps 316 to 320 which could have accumulated between the blade 110 and the exhaust passage fillers 188. If at step 326, the controller determines that the exhaust valve 106 is at a position that is less than or equal to 70%, then the controller proceeds to step 338 which will be described below. If at step 326, the exhaust valve 106 is at a position greater than 70%, then the controller proceeds to step 328.

At step 328, the actuator 104 maintains the exhaust valve 106 in its current position for 5 minutes. It is contemplated that this could be more or less than 5 minutes. Once the 5 minutes have elapsed, at step 330 the controller 262 sends a signal to the actuator 104 to move the exhaust valve 106 to the intermediate position (50% position), in response to which the controller 104 moves the exhaust valve 106 to this position. The actuator 104 maintains the exhaust valve 106 in the intermediate position for 1 second. It is contemplated that the amount of time at step 316 could be more or less than 1 second. After 1 second, the controller 262 proceeds to step 332. At step 332, the controller 262 sends a signal to the actuator 104 to move the exhaust valve 106 to the open position (100% position), in response to which the controller 104 reattempts to move the exhaust valve 106 to this position. Then the controller 262 proceeds to step 334. As step 334, the controller 262 determines if the exhaust valve 106 has failed again to reach the open position in the same way in which this was determined at step 308. If at step 334 the controller determines that the exhaust valve 262 has not failed to reach the open position, then the exhaust valve 106 is considered to have been successfully cleaned and the controller 262 proceeds to step 336 described above. If at step 334 the controller determines that the exhaust valve 262 has failed to reach the open position again, then the controller 262 returns to step 328.

If from steps 312 and 326 the controller 262 proceeds to step 338, then at step 338 the controller 262 determines if the value of the counter X is zero. If the value of the counter X is zero, then the controller 262 proceeds to step 340 where the controller 262 triggers a position fault code indicative that there was a problem in attempting to reach the open position of the exhaust valve 106. This position fault code can later be read from the controller 262 during maintenance of the engine 10. From step 340, the controller 262 proceeds to step 342. If the value of the counter X is not zero at step 338, the controller 262 also proceeds to step 342.

At step 342, the controller 262 sends a signal to the actuator 104 to return the exhaust valve 106 to the closed position (0% position), in response to which the controller 104 moves the exhaust valve 106 to this position. Then the controller 262 proceeds to step 344 where the determines if the value of the counter X is three. It is contemplated that the value of the counter X at step 344 could be one, two or more than three. If at step 344 the counter X has a value of three, then the controller 262 determines that the open position cannot be reached and at step 352 the exhaust valve 106 is maintained in the closed position until the engine 10 is turned off.

If at step 344 the counter X has not reached three, then at step 346, the counter X is increased by one. Then at step 348, the actuator 104 maintains the exhaust valve 106 in the closed position until it is determined by the controller 262 that the engine 10 has accumulated 5 minutes of operation above 4200 RPM since the valve has been moved to the closed position at step 342, thus heating up the blade 110 of the exhaust valve 106. It is contemplated that at step 348 the time could be more or less than 5 minutes and the engine speed could be more or less than 4200 RPM. From step 348, the controller 262 proceeds to step 350 where the position fault code that was triggered at step 340 is cleared from the controller 262. From step 350, the controller 262 returns to step 306.

Turning now to FIG. 30, the method 400 for cleaning the exhaust valve 106 will be described. At step 402, the controller 262 determines, based on the operating condition of the engine 10, if the exhaust valve 106 should be in the closed position. If that exhaust valve 106 is in the open position but the desired position is the closed position, then the controller 262 proceeds to step 404 to initiate the remainder of the method 400.

At step 404, the controller 262 sends a signal to the actuator 104 to move the exhaust valve 106 to the closed position (0% position), in response to which the controller 104 attempts to move the exhaust valve 106 to this position. Then at step 406, based on the signal received from the valve position sensor 266, the controller 262 determines if the exhaust valve 106 has reached or failed to reach the closed position. To do this, the controller 262 compares the position sensed by the valve position sensor 266 to the desired valve position, which in this case is the 0% closed position. Even if the 0% closed position is not reached, if the exhaust valve 106 has reached a position that is less than 5%, then the controller 262 determines that the exhaust valve 106 is sufficiently close to the desired closed position. As a result, the system is satisfied (step 426), no exhaust valve cleaning is required, and the controller 262 will reinitiate method 400 the next time the exhaust valve 106 is to be moved from the open position to the closed position. It is contemplated that the percentage used at step 308 could be more or less than 5%. If at step 406 the controller 262 determines that the exhaust valve 106 has failed to reach the desired closed position (i.e. the position of the exhaust valve 106 is not less than 5%), then the controller 262 proceeds to step 408.

At step 408, the controller 262 determines if the exhaust valve 106 has moved by a distance that is more than 5%. To do this, the controller 262 compares the position of the exhaust valve 106 sensed by the valve position sensor 266 before the controller 262 sent the signal to the controller 104 at step 404 to the position of the exhaust valve 106 sensed by the valve position sensor 266 after the controller 104 has attempted to move the exhaust valve 106 to the closed position at step 404. If the difference between these two positions is less than or equal to 5%, this indicates that the exhaust valve 106 is stuck. As a result, the controller 262 enters the fault operation mode 500 which will be described below. If at step 408 the controller 262 determines that the exhaust valve 106 is not stuck, then the controller proceeds to step 410. It is contemplated that the percentage used at step 408 could be more or less than 5%.

At step 410, based on the signal received from the valve position sensor 266, the controller 262 determines if the exhaust valve 106 has reached a position that is less than 30%. If not, the controller 262 enters the fault operation mode 500. If the exhaust valve 106 has reached a position that is less than 30% (but more than or equal to 5%), then the controller proceeds to step 412. It is contemplated that the percentage used at step 410 could be more or less than 30%.

At step 412, the controller 262 resets a counter n to zero. Then at step 414, the actuator 104 maintains the exhaust valve 106 in its current position for 10 seconds. It is contemplated that the time at step 414 could be more or less than 10 seconds. Once the 10 seconds have elapsed, then at step 416 the controller 262 sends a signal to the actuator 104 to move the exhaust valve 106 to the intermediate position (50% position), in response to which the controller 104 moves the exhaust valve 106 to this position. The actuator 104 maintains the exhaust valve 106 in the intermediate position for 1 second. It is contemplated that the amount of time at step 416 could be more or less than 1 second. After 1 second, the controller 262 proceeds to step 418. At step 418, the controller 262 sends a signal to the actuator 104 to move the exhaust valve 106 to the closed position (0% position), in response to which the controller 104 reattempts to move the exhaust valve 106 to this position. Then the controller 262 proceeds to step 420. As step 420, the controller 262 determines if the exhaust valve 106 has failed again to reach the closed position in the same way in which this was determined at step 406. If at step 420 the controller 262 determines that the exhaust valve 262 has not failed to reach the closed position, then exhaust valve 106 is considered to have been successfully cleaned and the controller 262 proceeds to step 426 described above. If at step 420 the controller 262 determines that the exhaust valve 262 has failed to reach the closed position again, then the controller 262 proceeds to step 422.

At step 422, the controller 262 increases the counter n by 1, and then at step 424 determines if the counter n has reached 5. It is contemplated that the value of the counter n at step 424 could be more or less than 5. If the counter n has not reached 5 at step 424, then the controller 262 returns to step 414 and the following steps are repeated. The cycles of heating and moving of the exhaust valve 106 should clean at least some of the exhaust components that have accumulated on the blade 110 of the exhaust valve 106. If at step 424 the counter n has reached 5, then the controller 262 enters the fault operation mode 500.

Turning now to FIG. 31, the fault operation mode 500 of the methods 300, 400 will be described. Upon entering the fault operation mode 500, at step 502 the controller 262 triggers a position fault code indicative that there was a problem in attempting to reach the open or closed position, as the case may be, of the exhaust valve 106. This position fault code can later be read from the controller 262 during maintenance of the engine 10. From step 502, the controller 262 proceeds to step 504 where the controller 262 triggers a system critical fault code indicative that the degree by which the desired open or closed position could not be reached is significant. This could be indicative of the exhaust valve 106 being stuck due to a large build-up of exhaust components that cannot be cleaned by the method 300 or 400, as the case may be, or could also indicate a mechanical or electrical failure in the exhaust valve system 260. This system critical fault code can later be read from the controller 262 during maintenance of the engine 10. Then at step 506, the controller 506 sends a signal to a display gauge associated with the engine 10 to flash a warning light that can be seen by the user of the engine 10 to indicate that there is a fault with the exhaust valve system 260 specifically, or more generally with the engine 10. It is contemplated that instead of or in addition to flashing a warning light at step 506, an audible warning sound could be emitted, or some other feedback could be given to the user of the engine 10. Then at step 508, the controller 262 controls the engine 10 in a limp home mode. In the limp home mode, which can also be referred to a "safe" mode, the performance of the engine 10 is limited. This includes limiting the maximum speed of the engine 10 and/or limiting the acceleration of the engine 10. In some embodiments, the controller 262 will continue to operate the engine 10 in the limp home mode until maintenance is performed on the engine 10 and the system critical fault code of step 504 is cleared from the controller 262 by the technician performing the maintenance. It is contemplated that the steps 502 to 508 could be performed in any order. It is also contemplated that the fault operation mode 500 could include shutting the engine 10 down entirely.

In some embodiments, the position of the exhaust valves 106 is continuously monitored by the controller 262 via the valve position sensor 266 to determine if the exhaust valves 106 drift. The exhaust valves 106 are said to drift when their positions change without signals to do so sent by the controller 262. This could occur due to the lead screw 132 being worn for example, but there are other possible reasons why such slow, non-deliberate movement of the exhaust valves 106 could occur. When the controller 262 determines that the exhaust valves 106 are drifting, for example that they have moved by a distance of more than 5% from their desired position, the controller 262 sends a signal to the electric motor 130 to move the exhaust valves 106 back to the position that the exhaust valves 106 should have. In some embodiments, should the exhaust valves 106 drift and be returned to their correct position a certain number of times, for example five times, before a change of position of the exhaust valves 106 is requested, from the retracted position to the actuated position for example, the controller 262 triggers a drift fault code indicative of drifting of the exhaust valves 106. This drift fault code can later be read from the controller 262 during maintenance of the engine 10.

As discussed above, when in the actuated position, the stopper surfaces 214 of the exhaust valves 106 abut the steps 218 of the exhaust valve passages 42, and when in the retracted position, the stopper surfaces 219 of the exhaust valves 106 abut the exhaust valve passage fillers 188. In order to properly keep the exhaust valves 106 in these positions, a certain clamping load is applied to the exhaust valves 106 by the electric motor 130 of the electric actuator 104. As a result of the clamping load being applied, the vibration absorbing mount 136 and the vibration absorbing mounts 186 are compressed. However, should the clamping load applied be too high, the vibration absorbing mounts 136, 186 can become too compressed, thereby reducing their effectiveness at reducing the transmission of vibrations. As such, in some embodiments, the controller 262 controls the clamping load being applied by the electric motor 130 to correspond to a desired clamping load. The desired clamping load is a clamping load that is sufficiently high to properly keep the exhaust valves 106 in their actuated and retracted positions, but that is not high enough to negatively affect the effectiveness of the vibration absorbing mounts 136, 186. It is contemplated that the desired clamping load for the actuated position of the exhaust valves 106 could be different from the desired clamping load for the retracted position of the exhaust valves 106. As indicated above, the electric motor 130 is powered by a battery. The voltage of the battery varies during use as the battery charges and discharges. For a given duty cycle, the load applied by the electric motor 130 will vary depending on the actual voltage of the battery. In order to apply the desired clamping load, the controller 262 determines the actual voltage of the battery and then adjusts the duty cycle used to control the electric motor 130 accordingly. The higher the actual voltage of the battery is, the lower the duty cycle will be so as to obtain the desired clamping load regardless of the actual voltage of the battery.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. An exhaust valve assembly for a two-stroke internal combustion engine comprising:
    a housing adapted for connection to an engine block of the two-stroke internal combustion engine;
    an electric actuator comprising an electric motor, the electric motor being disposed in the housing; and
    at least one reciprocating exhaust valve operatively connected to the electric actuator, the at least one exhaust valve being linearly movable by the electric motor, and a portion of the at least one exhaust valve being disposed in the housing.

2. The exhaust valve assembly of claim 1, wherein:
    each exhaust valve of the at least one exhaust valve has a blade and a shaft connected to the blade; and
    the portion of the at least one exhaust valve being disposed in the housing is a portion of the shaft.

3. The exhaust valve assembly of claim 2, wherein:
    the housing includes:
        a housing body; and
        a base plate connected to the housing body;
    the electric motor being disposed in a volume defined between the housing body and the base plate; and
    the base plate is disposed between the housing body and the blade of each of the at least one exhaust valve.

4. The exhaust valve assembly of claim 3, wherein the shaft of each of the at least one exhaust valve extends through the base plate.

5. The exhaust valve assembly of claim 4, further comprising at least one pair of exhaust valve passage fillers connected to the base plate for filling a portion of at least one exhaust valve passage defined by the engine block for receiving the at least one exhaust valve; and
    wherein:
        the least one pair of exhaust valve passage fillers is disposed between the base plate and the blade of the at least one exhaust valve; and
        the shaft of the at least one exhaust valve extends between the exhaust valve passage fillers of the at least one pair of exhaust valve passage fillers.

6. The exhaust valve assembly of claim 5, wherein the at least one pair of exhaust valve passage fillers are integral with the base plate.

7. The exhaust valve assembly of claim 4, wherein, for each exhaust valve of the at least one exhaust valve, the housing includes a seal disposed between the base plate and the shaft of the at least one exhaust valve.

8. The exhaust valve assembly of claim 1, further comprising a vibration absorbing mount connecting the electric actuator to the housing.

9. The exhaust valve assembly of claim 8, wherein:
    the housing includes:
        a housing body; and
        a cover connected to the housing body, the housing body being disposed at least in part between the blade of the at least one valve and the cover; and
    the vibration absorbing mount connects the electric actuator to the cover.

10. The exhaust valve assembly of claim 1, wherein the electric actuator further comprises a lead screw operatively connecting the at least one exhaust valve to an output shaft of the electric motor for converting rotation of the output shaft to linear motion.

11. The exhaust valve assembly of claim 10, wherein the lead screw and the output shaft are parallel to each other.

12. The exhaust valve assembly of claim 1, further comprising a vibration absorbing mount connecting the at least one exhaust valve to the electric actuator.

13. The exhaust valve assembly of claim 1, further comprising a tie bar connected to the electric actuator; and wherein:
    the at least one exhaust valve is a plurality of exhaust valves; and
    each exhaust valve of the plurality of exhaust valves is operatively connected to the electric actuator via the tie bar.

14. The exhaust valve assembly of claim 13, wherein:
    each exhaust valve of the plurality of exhaust valves has a blade and a shaft connected to the blade; and
    the shaft of each exhaust valve of the plurality of exhaust valves is connected to the tie bar.

15. The exhaust valve assembly of claim 14, further comprising a plurality of vibration absorbing mounts connecting the shafts of the plurality of exhaust valves to the tie bar.

16. A two-stroke internal combustion engine comprising:
    an engine block defining:
        at least one cylinder;
        at least one exhaust passage communicating with the at least one cylinder; and
        at least one exhaust valve passage communicating with the at least one exhaust passage;
    at least one piston disposed in the at least one cylinder; and
    the exhaust valve assembly of claim 1 connected to the engine block, the at least one exhaust valve being disposed at least in part in the at least on exhaust valve passage.

17. The two-stroke internal combustion engine of claim 16, wherein the housing of the exhaust valve assembly is fastened to the engine block.

* * * * *